US00RE39851E

(19) United States
(12) Reissued Patent
Ogiso et al.

(10) Patent Number: US RE39,851 E
(45) Date of Reissued Patent: Sep. 25, 2007

(54) INTERNAL COMBUSTION ENGINE HAVING A VARIABLE VALVE TRAIN

(75) Inventors: Makoto Ogiso, Susono (JP); Mitsuru Saitoh, Gotenba (JP); Isao Matsumoto, Susono (JP)

(73) Assignee: Toyota Jidosha Kabushiki Kaisha, Toyota (JP)

(21) Appl. No.: 10/883,194

(22) Filed: Jul. 2, 2004

Related U.S. Patent Documents

Reissue of:
(64) Patent No.: 6,412,455
Issued: Jul. 2, 2002
Appl. No.: 09/721,949
Filed: Nov. 27, 2000

(30) Foreign Application Priority Data

Nov. 25, 1999 (JP) ..... 11-334526
Mar. 28, 2000 (JP) ..... 2000-089771
Oct. 17, 2000 (JP) ..... 2000-316425

(51) Int. Cl.
*F01L 1/34* (2006.01)

(52) U.S. Cl. ..... 123/90.15; 123/90.11; 123/90.17; 123/403; 123/518; 123/399

(58) Field of Classification Search ..... 123/90.15, 123/90.16, 90.17, 90.11, 403, 399, 518
See application file for complete search history.

(56) References Cited

U.S. PATENT DOCUMENTS 2,773,490 A 12/1956 Miller et al.
3,762,381 A 10/1973 Dave
3,888,217 A 6/1975 Hisserich
3,897,760 A 8/1975 Hisserich
4,483,283 A 11/1984 Hausknecht
5,722,363 A * 3/1998 Iida et al. ..... 123/305
5,755,210 A * 5/1998 Sato et al. ..... 123/518
5,964,192 A * 10/1999 Ishii ..... 123/90.11
6,213,568 B1 * 4/2001 Feigel ..... 303/114.1
6,305,757 B1 * 10/2001 Ohsaki et al. ..... 303/114.3
6,397,814 B1 6/2002 Nagaishi et al.
7,011,053 B2 * 3/2006 Muraji ..... 123/90.11

FOREIGN PATENT DOCUMENTS

| | | | |
|---|---|---|---|
| EP | 0 387 089 A1 | | 9/1990 |
| EP | 0 816 196 A2 | | 1/1998 |
| EP | 0 867 602 A1 | | 9/1998 |
| GB | 350762 | | 6/1931 |
| GB | 388712 | | 3/1933 |
| GB | 497878 | | 12/1938 |
| GB | 518581 | | 3/1940 |
| JP | 04159427 A | | 6/1992 |
| JP | A-4-171230 | | 6/1992 |
| JP | A-5-180013 | * | 7/1993 |
| JP | A-6-117280 | * | 4/1994 |
| JP | A-6-117303 | | 4/1994 |
| JP | A-10-331671 | | 12/1998 |
| JP | 10-331671 | * | 12/1998 |
| JP | 11311135 A | | 11/1999 |

* cited by examiner

*Primary Examiner*—Ching Chang
(74) *Attorney, Agent, or Firm*—Oliff & Berridge PLC

(57) ABSTRACT

An internal combustion engine is provided with a variable valve train capable of altering opening and closing timings and/or opening amounts of at least one of an intake valve and an exhaust valve of an internal combustion engine. The internal combustion engine is characterized in that the internal combustion engine is further provided with a negative pressure mechanism that operates using intake pipe negative pressure generated in an intake passage of the internal combustion engine, a throttle valve for adjusting the flow rate of intake air flowing through the intake passage, and negative pressure generating device that controls at least one of the variable valve train and the throttle valve to generate the intake pipe negative pressure, when the intake pipe negative pressure for operation of the negative pressure mechanism is insufficient.

33 Claims, 15 Drawing Sheets

INTERNAL COMBUSTION ENGINE HAVING A VARIABLE VALVE TRAIN

Matter enclosed in heavy brackets [ ] appears in the original patent but forms no part of this reissue specification; matter printed in italics indicates the additions made by reissue.

The disclosure of Japanese Patent Application Nos. HEI 11-334526 filed on Nov. 25, 1999, 2000-89771 filed on Mar. 28, 2000 and 2000-316425 filed on Oct. 17, 2000, including the specifications, drawings, and abstracts are incorporated herein by reference in their entirety.

BACKGROUND OF THE INVENTION

1. Field of the Invention

The invention relates to an internal combustion engine equipped with a variable valve train capable of arbitrarily altering the opening and closing timing and/or the opening amount of at least one of an intake valve and exhaust valve. In particular, the invention relates to a technology for favorably generating intake pipe negative pressure in an intake passage in an internal combustion engine.

2. Description of the Related Art

Recent years have seen the development of internal combustion engines equipped with a variable valve train capable of altering the opening and closing timing and/or the opening amount of at least one of an intake valve and exhaust valve in an internal combustion engine mounted in a vehicle or the like for the purpose of improvement in brake thermal efficiency, improvement in exhaust emission, reduction in specific fuel consumption, or the like.

An internal combustion engine provided with an intake and exhaust valve driven to open and close electromagnetic force, i.e. what is known as an electromagnetic valve train, is known as an example of a variable valve train. In an internal combustion engine provided with this type of electromagnetic valve train, because there is no need to drive the intake and exhaust valve to open and close using the rotation force of the engine output shaft, mechanical loss originating in the drive of the intake and exhaust valve is prevented. Moreover, in the internal combustion engine provided with the electromagnetic valve train, it is possible to arbitrarily alter the valve opening time and the opening and closing timing of the intake and exhaust valve, so that pump loss of the internal combustion engine caused by a throttle valve can be suppressed.

However, in a non-throttle operation-controlled internal combustion engine, because almost no pump loss of the internal combustion engine is generated, there is no negative pressure in the combustion chamber of the internal combustion engine during deceleration of the vehicle. As a result, the problem arises that the engine braking effect is diminished.

In response to this, control methods for internal combustion engines, such as that described in JP Laid-Open No. HEI 10-331671, have been proposed. The control method for an internal combustion engine described in the above publication aims at increasing the engine braking effect in an internal combustion engine provided with electromagnetic intake and exhaust valves and non-throttle operation-controlled with these electromagnetic valves. In this control method, the electromagnetic valves are controlled to increase the pump loss of the internal combustion engine. Thus, negative pressure is generated within the cylinders of the internal combustion engine, thereby increasing the engine brake effect.

SUMMARY OF THE INVENTION

An object of the invention is to provide, in an internal combustion engine provided with a variable valve train capable of arbitrarily altering the opening and closing timing and/or the amount of opening of at least one of an intake valve and an exhaust valve and a negative pressure mechanism for operating using intake pipe negative pressure generated in an intake passage of the internal combustion engine, a technology capable of ensuring negative pressure according to the operation of the negative pressure mechanism.

The internal combustion engine having a variable valve train according to the first aspect of the invention includes: a variable valve train capable of adjusting opening and closing timings and/or opening amounts of at least one of an intake valve and an exhaust valve of an internal combustion engine; a negative pressure mechanism that operates using intake pipe negative pressure generated in an intake passage of the internal combustion engine; and negative pressure supply device that supplies negative pressure to the negative pressure mechanism when a predetermined condition is satisfied.

In the thus structured internal combustion engine, the negative pressure supply device supplies negative pressure to the negative pressure mechanism when a predetermined condition is satisfied. In this case, the desired negative pressure is supplied to the negative pressure mechanism with no need of altering the mode of operation of the variable valve train. Namely, the desired negative pressure is supplied to the negative pressure mechanism without there being any effect on the operating state of the internal combustion engine.

A vacuum pump can be taken as an example of the negative pressure supply device according to the invention.

The predetermined condition according to the invention can be exemplified as follows: the intake pipe negative pressure for operation of the negative pressure mechanism is insufficient; or a predetermined time period has passed since the negative pressure supply device finally supplied the negative pressure to the negative pressure mechanism. The above-mentioned predetermined time period may be a value determined using time as a parameter, or may be a value determined using a running distance of a vehicle provided with the internal combustion engine as a parameter.

Examples of the variable valve train according to the invention include: an electromagnetic valve train for driving the intake valve and/or the exhaust valve using the electromagnetic force; a hydraulic valve train for driving the intake valve and/or the exhaust valve using hydraulic pressure; and a mechanical variable valve train for, in an internal combustion engine provided with a camshaft that drives the intake valve and/or the exhaust valve to open and close using the rotation force of a crankshaft, altering the rotation phase of the camshaft relative to the crankshaft.

The internal combustion engine having a variable valve train according to the second aspect of the invention includes: a variable valve train capable of adjusting opening and closing timings and/or opening amounts of at least one of an intake valve and an exhaust valve of an internal combustion engine; a negative pressure mechanism that operates using intake pipe negative pressure generated in an intake passage of the internal combustion engine; a throttle valve for adjusting a flow rate of intake air flowing through the intake passage; and negative pressure generating device that generates intake pipe negative pressure by controlling the variable valve train and the throttle valve when a predetermined condition is satisfied.

In the thus structured internal combustion engine, when the predetermined condition is satisfied, the negative pressure generating device generates intake pipe negative pressure using the variable valve train and the throttle valve in combination. At this time, the negative pressure generating device may also, for example, control the variable valve train such that the internal combustion engine pump efficiency is increased, and close the throttle valve by a predetermined opening amount.

In this case, because intake pipe negative pressure is generated using the variable valve train and the throttle valve in combination, it is easier to control the operating state of the internal combustion engine compared to when intake pipe negative pressure is generated using solely the variable valve train, and it is also easy to control the torque of the internal combustion engine.

The predetermined condition according to the invention can be exemplified as follows: the intake pipe negative pressure for operation of the negative pressure mechanism is insufficient; a predetermined time period has passed since the negative pressure supply device finally supplied the negative pressure to the negative pressure mechanism; or a vehicle provided with the internal combustion engine is traveling in a deceleration state.

Examples of the variable valve train according to the invention include: an electromagnetic valve train for driving the intake valve and/or the exhaust valve using the electromagnetic force; and a mechanical variable valve train for, in an internal combustion engine provided with a camshaft that drives the intake valve and/or the exhaust valve to open and close using the rotation force of a crankshaft, altering the rotation phase of the camshaft relative to the crankshaft.

Moreover, when intake pipe negative pressure needs to be generated, it is also possible for the negative pressure generating device according to the invention to control the variable valve train and the throttle valve such that no variation is generated in the torque of the internal combustion engine.

Further, when intake pipe negative pressure needs to be generated, it is also possible for the negative pressure generating device according to the invention to control the variable valve train and the throttle valve such that the torque required by the internal combustion engine and the actual torque of the internal combustion engine match. At this time, it is preferable if the required torque is decided with the number of revolutions of the internal combustion engine and the accelerator opening angle as parameters.

An internal combustion engine having a variable valve train according to the third aspect of the invention includes: a variable valve train capable of adjusting an opening and closing timing and/or opening amount of at least one of an intake valve and an exhaust valve of the internal combustion engine; a negative pressure mechanism that operates using an intake pipe negative pressure generated in an intake passage of the internal combustion engine; a throttle valve for adjusting a flow rate of intake air flowing through the intake passage; and throttle valve controller that closes the throttle valve by a predetermined amount when a predetermined condition is satisfied.

In the thus structured internal combustion engine having the variable valve train, the throttle valve controller that closes the throttle valve by the predetermined amount when the predetermined condition is satisfied. In this case, the intake pipe negative pressure is generated in the intake passage downstream of the throttle valve. As a result, the intake pipe negative pressure for operation of the negative pressure mechanism is secured.

The predetermined condition according to the invention can be exemplified as follows: the intake pipe negative pressure for operation of the negative pressure mechanism is insufficient; a predetermined time period has passed since the negative pressure supply device finally supplied the negative pressure to the negative pressure mechanism; or a vehicle provided with the internal combustion engine is traveling in a deceleration state.

An internal combustion engine having a variable valve train according to the fourth aspect of the invention includes: a variable valve train capable of adjusting an opening and closing timing and/or opening amount of at least one of an intake valve and an exhaust valve of the internal combustion engine; a negative pressure mechanism that operates using an intake pipe negative pressure generated in an intake passage of the internal combustion engine; a throttle valve for adjusting a flow rate of intake air flowing through the intake passage; throttle valve controller that closes the throttle valve by a predetermined amount when a predetermined condition is satisfied; and valve train controller that, in a case where the throttle valve control means closes the throttle valve by the predetermined amount, controls the variable valve train so as to alter the opening and closing timing and/or opening amount of at least one of the intake valve and the exhaust valve with respect to a case where the throttle valve controller does not close the throttle valve by the predetermined amount.

At this time, the valve train controller may control the variable valve train such that required torque for the internal combustion engine matches actual torque thereof, or may control the variable valve train so as to suppress torque variation of the internal combustion engine. Note that the required torque may be determined by using a number of revolutions of the internal combustion engine and an accelerator opening amount as parameters.

An internal combustion engine having a variable valve train according to the fifth aspect of the invention includes: a variable valve train capable of adjusting an opening and closing timing and/or opening amount of at least one of an intake valve and an exhaust valve of the internal combustion engine; a negative pressure mechanism that operates using an intake pipe negative pressure generated in an intake passage of the internal combustion engine; a throttle valve for adjusting a flow rate of intake air flowing through the intake passage; intake air amount controller that controls the variable valve train to adjust an intake air amount of the internal combustion engine while retaining the throttle valve at a predetermined opening amount, when an operating state of the internal combustion engine is in a predetermined operating region; and throttle valve controller that closes the throttle valve by a predetermined amount from the predetermined opening amount when a predetermined condition is satisfied while the intake air amount controller is controlling the intake air amount of the internal combustion engine.

In the thus structured internal combustion engine having the variable valve train, so-called non-throttle operation control is conducted when the operating state of the internal combustion engine is in the predetermined operating region. More specifically, when the operating state of the internal combustion engine is in the predetermined operating region (e.g., in a low/medium load operating region), the intake air amount controller controls the variable valve train to adjust the intake air amount of the internal combustion engine while retaining the throttle valve at the predetermined opening amount (e.g., at a substantially fully open position).

If the predetermined condition is satisfied while the operating state of the internal combustion engine is in the predetermined operating region, in other words, while the intake air amount controller is conducting the non-throttle operation control, the throttle valve controller closes the throttle valve by the predetermined amount from the predetermined opening amount. In this case, the intake pipe negative pressure is generated in the intake passage downstream of the throttle valve, so that the negative pressure can operate using the intake pipe negative pressure.

An internal combustion engine having a variable valve train according to the sixth aspect of the invention includes: a variable valve train capable of adjusting an opening and closing timing and/or opening amount of at least one of an intake valve and an exhaust valve of an internal combustion engine; a negative pressure mechanism that operates using an intake pipe negative pressure generated in an intake passage of the internal combustion engine; a throttle valve for adjusting a flow rate of intake air flowing through the intake passage; intake air amount controller that controls the variable valve train to adjust an intake air amount of the internal combustion engine while retaining the throttle valve at a predetermined opening amount, when an operating state of the internal combustion engine is in a predetermined operating region; an evaporation fuel reflux mechanism for refluxing evaporation fuel generated in a fuel tank of the internal combustion engine into the intake passage; and throttle valve controller that closes the throttle valve by a predetermined amount from the predetermined opening amount when the evaporation fuel reflux mechanism needs to be operated while the intake air amount controller is controlling the intake air amount of the internal combustion engine.

The thus structured internal combustion engine having the variable valve train may further include valve train controller that controls the variable valve train such that the intake air amount of the internal combustion engine does not change, when the throttle valve controller closes the throttle valve by the predetermined amount in order to operate the evaporation fuel reflux mechanism. In this case, the intake pipe negative pressure for operation of the evaporation fuel reflux mechanism can be secured without changing the intake air amount of the internal combustion engine.

Examples of the variable valve train according to the invention include: an electromagnetic valve train for driving the intake valve and/or the exhaust valve to open and close using the electromagnetic force; a hydraulic valve train for driving the intake valve and/or the exhaust valve to open and close using hydraulic pressure; a mechanical variable valve train for altering the rotation phase of a camshaft that drives the intake valve and/or the exhaust valve to open and close using the rotation force of a crankshaft; and an appropriate combination of the above-mentioned valve trains.

DETAILED DESCRIPTION OF THE PREFERRED EMBODIMENTS

Figure 1:
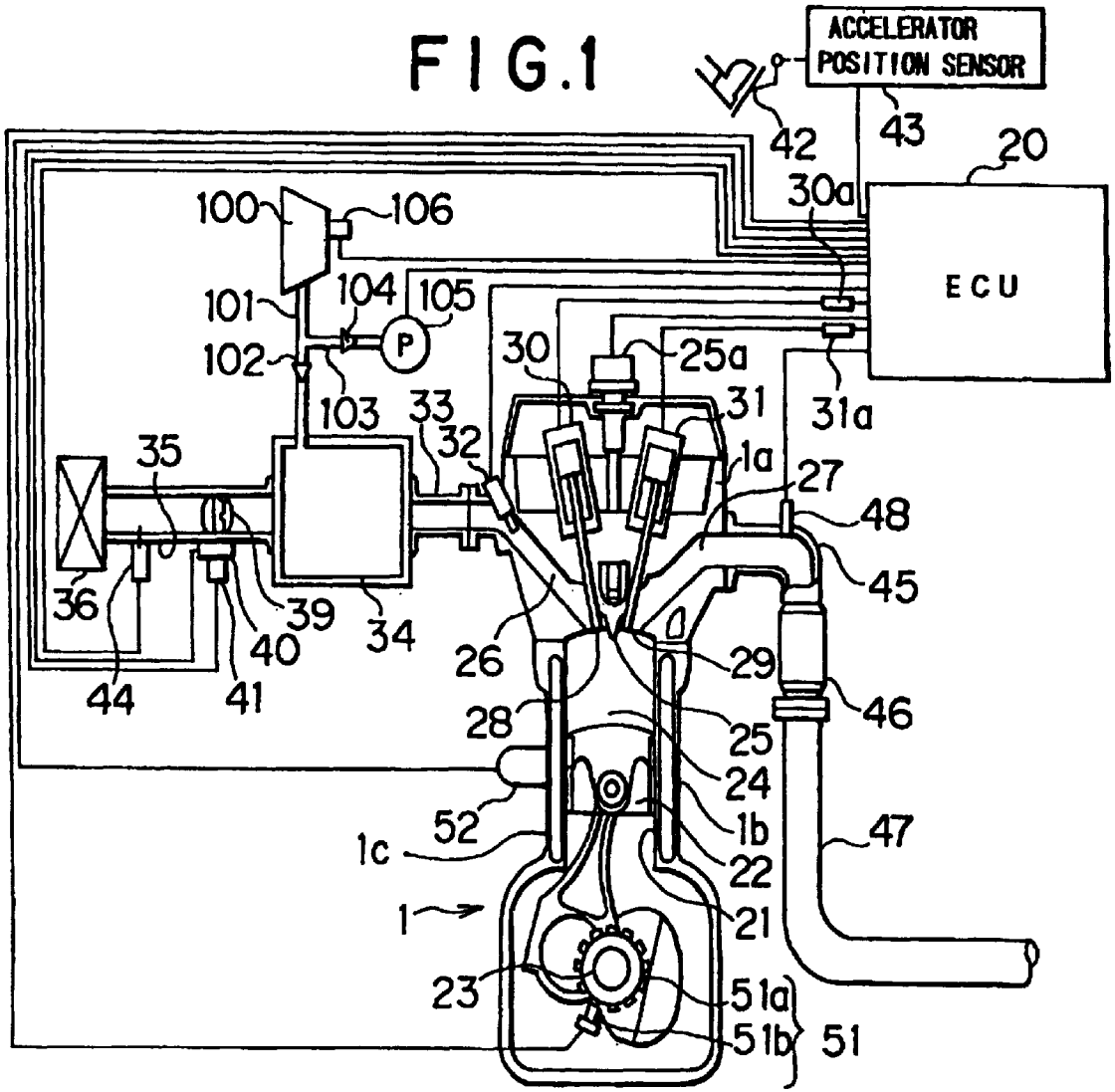
FIG. 1 is a diagram showing the schematic structure of an internal combustion engine having a variable valve train according to the first embodiment.

Specific operating aspects of the internal combustion engine having a variable valve train according to the invention will now be described referring to the drawings.

<First Embodiment>

Firstly, the first embodiment of the internal combustion engine having a variable valve train according to the invention will be described referring to FIGS. 1 to 4. Here, an electromagnetic drive mechanism for driving an intake and exhaust valve to open and close using electromagnetic force will be described as an example of the variable valve train according to the invention. Also, a brake booster of a vehicle braking device will be described as an example of a negative pressure mechanism according to the invention.

FIG. 1 is a diagram showing the schematic structure of an internal combustion engine and an intake and exhaust system thereof according to the present embodiment. The internal combustion engine 1 shown in FIG. 1 is a water-cooled four-stroke cycle gasoline engine provided with four cylinders 21.

The internal combustion engine 1 is provided with a cylinder block 1b in which a plurality of the cylinders 21 and a cooling water passage 1c are formed, and a cylinder head 1a fixed to the top of the cylinder block 1b.

A crankshaft 23 as an engine output shaft is supported so as to be freely rotatable by the cylinder block 1b. This crankshaft 23 is linked to pistons 22 loaded inside each cylinder 21 so as to be able to slide freely therein.

Combustion chambers 24 are defined above the pistons 22 of the respective cylinders 21 by the top surface of the piston 22 and the side walls of the cylinder head 1a. Spark plugs 25 are attached to the cylinder head 1a so as to face the combustion chambers 24 of the respective cylinders 21. An ignitor 25a for applying a drive current to the spark plugs 25 is connected to the spark plugs 25.

Two open ends of intake ports 26 and two open ends of exhaust ports 27 are formed in the cylinder head 1a at positions facing the combustion chamber 24 of each cylinder 21. Intake valves 28 for opening and closing the respective open ends of the intake ports 26 and exhaust valves 29 for opening and closing the respective open ends of the exhaust ports 27 are provided in the cylinder head 1a so as to be able to advance and retract freely.

The cylinder head 1a is provided with the same number of electromagnetic drive mechanisms 30 as that of intake valves 28 for advancing and retracting the respective intake valves 28 by using electromagnetic force generated in response to application of exciting current (hereinafter referred to as intake side electromagnetic drive mechanisms 30). A drive circuit 30a for applying exciting current to the intake side electromagnetic drive mechanisms 30 (hereinafter referred to as intake side drive circuit 30a) is electrically connected to each intake side electromagnetic drive mechanism 30.

The cylinder head 1a is provided with the same number of electromagnetic drive mechanisms 31 as that of exhaust valves 29 for advancing and retracting the respective exhaust valves 29 by using electromagnetic force generated in response to application of exciting current (hereinafter referred to as exhaust side electromagnetic drive mechanisms 31). A drive circuit 31a for applying exciting current to the exhaust side electromagnetic drive mechanisms 31 (hereinafter referred to as exhaust side drive circuit 31a) is electrically connected to each exhaust side electromagnetic drive mechanism 31.

The above-mentioned intake side electromagnetic drive mechanisms 30, intake side drive circuit 30a, exhaust side electromagnetic drive mechanisms 31 and exhaust side drive circuit 31a correspond to one embodiment of the variable valve train according to the invention.

Here, the specific structure of the intake side electromagnetic drive mechanism 30 and the exhaust side electromagnetic drive mechanism 31 will be described. Note that, because the intake side electromagnetic drive mechanism 30 and the exhaust side electromagnetic drive mechanism 31 have the same structure, only the intake side electromagnetic drive mechanism 30 will be described in the example.

Figure 2:
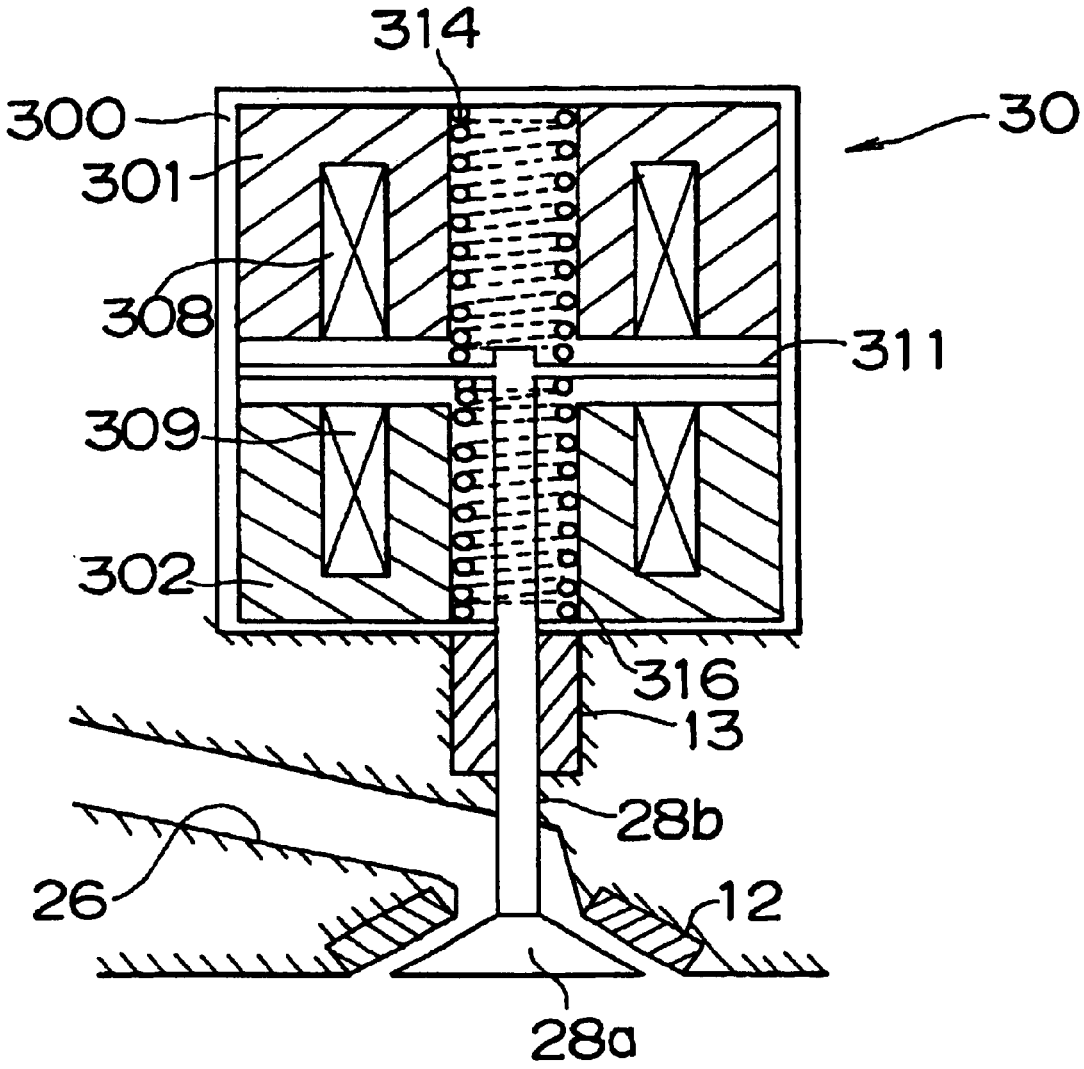
FIG. 2 is a diagram showing the structure of an electromagnetic drive mechanism on the intake side.

FIG. 2 is a cross sectional view showing the structure of the intake side electromagnetic drive mechanism 30.

As is shown in FIG. 2, the intake side electromagnetic drive mechanism 30 is provided with an enclosure 300 formed from a cylindrical non-magnetic body. A first core 301 and a second core 302, each formed from a ring shaped soft magnetic body having an outer diameter substantially the same size as the inner diameter of the enclosure 300, are placed in series at a predetermined distance in the enclosure 300.

A first electromagnetic coil 308 is held at a position facing the predetermined gap in the first core 301. A second electromagnetic coil 309 is held at a position facing first electromagnetic coil 308 in the second core 302. The first and second electromagnetic coils 308, 309 are electrically connected to the intake side drive circuit 30a.

An armature 311, composed of a circular plate-shaped soft magnetic body having an outer diameter substantially the same size as the inner diameter of the enclosure 300, is provided in the predetermined gap. The armature 311 is supported by an upper spring 314 held in a hollow portion of the first core 301 and by a lower spring 316 held in a hollow portion of the second core 302 so as to be able to advance and retract freely in an axial direction.

Note that the urging force of the upper spring 314 and the lower spring 316 is set so as to be balanced when the armature 311 is in a position in the center between the first core 301 and the second core 302 in the predetermined gap.

The intake valve 28 is formed from a valve body 28a, which opens and closes the intake port 26 by being seated in or separated from a valve seat 12 provided at the open end of the intake port 26 in the combustion chamber 24, and a valve shaft 28b shaped like a column having the distal end portion thereof fixed to the valve body 28a.

The valve shaft 28b is supported by a cylindrical valve guide 13 provided in the cylinder head 1a so as to be able to freely advance and retract. The base end portion of the valve shaft 28b extends into the enclosure 300 of the intake side electromagnetic drive mechanism 30, and is fixed to the armature 311 via the hollow portion of the second core 302.

Note that the axial length of the valve shaft 28b is set such that, when the armature 311 is held in a position midway between the first core 301 and the second core 302 in the predetermined gap, namely, when the armature 311 is in a neutral state, the valve body 28a is held in a position midway between the fully open displacement end and the fully closed displacement end (hereinafter referred to as the mid-open position).

In the intake side electromagnetic drive mechanism 30 constructed in this way, when no exciting current is being applied from the intake side drive circuit 30a to the first electromagnetic coil 308 and the second magnetic coil 309, the armature 311 is placed in a neutral state and, consequently, the valve body 28a is held in the mid-open position.

In the intake side electromagnetic drive mechanism 30, if an exciting current is applied from the intake side drive circuit 30a to the first electromagnetic coil 308, electromagnetic force is generated between the first core 301, first electromagnetic coil 308 and armature 311 so as to displace the armature 311 toward the first core 301. If an exciting current is applied from the intake side drive circuit 30a to the second electromagnetic coil 309, electromagnetic force is generated between the second core 302, second electromagnetic coil 309 and armature 311 so as to displace the armature 311 toward the second core 302.

As a result, by applying exciting current from the intake side drive circuit 30a alternately to the first electromagnetic coil 308 and second electromagnetic coil 309 in the intake side electromagnetic drive mechanism 30, the armature 311 is advanced and retracted, and thus the valve shaft 28b is driven to advance and retract as well as the valve body 28a is simultaneously driven to open and close.

At this time, the valve opening amount and the opening and closing timing of the intake valve 28 can be controlled by altering the magnitude and application timing of the exciting current to the first electromagnetic coil 308 and second electromagnetic coil 309.

Returning now to FIG. 1, an intake branch pipe 33 formed from four branch pipes is connected to the cylinder head 1a of the internal combustion engine 1, and each branch pipe of the intake branch pipe 33 communicates with the intake port 26 of the respective cylinder. Fuel injection valves 32 are attached to the cylinder head 1a at positions near the joint portion with the intake branch pipe 33 such that the nozzles thereof face the respective intake ports 26.

The intake branch pipe 33 is connected to a surge tank 34 for suppressing intake surges. An intake pipe 35 is connected to the surge tank 34. The intake pipe 35 is connected to an air cleaner box 36 for removing dust and impurities from the air intake.

An airflow meter 44 for outputting electric signals corresponding to the mass of the air flowing through the intake pipe 35 (i.e. the mass of the air that is taken in) is attached to the intake pipe 35. A throttle valve 39 for adjusting the flow amount of the intake flowing through the intake pipe 35 is provided at a position downstream of the airflow meter 44 in the intake pipe 35.

The throttle valve 39 is provided with a throttle actuator 40 including a stepper motor or the like for driving the throttle valve 39 to open and close in accordance with the size of the power applied thereto, and a throttle position sensor 41 for outputting electric signals corresponding to the degree of the opening of the throttle valve 39.

The surge tank 34 is connected to a first negative pressure passage 101 that is connected to a brake booster 100 that serves as a source for magnifying the force of the mechanism for braking the vehicle in which the internal combustion engine 1 is mounted. The brake booster 100 corresponds to the negative pressure mechanism according to the invention.

A unidirectional valve 102 for allowing the flow of air from the brake booster 100 to the surge tank 34 and shutting off the flow of air therefrom to the brake booster 100 is provided partway along the first negative pressure passage 101.

A second negative pressure passage 103 is connected to the first negative pressure passage 101 at a position on the brake booster 100 side of the unidirectional valve 102. The second negative pressure passage 103 is connected to a vacuum pump 105.

A unidirectional valve 104 for allowing the flow of air from the first negative pressure passage 101 to the vacuum pump 105 and shutting off the flow of air therefrom to the negative pressure passage 101 is provided partway along the second negative pressure passage 103.

A vacuum sensor 106 for outputting electric signals corresponding to the pressure within the brake booster 100 is attached to the brake booster 100.

An exhaust branch pipe 45 formed from four branch pipes merged into a single collecting pipe at a position immediately downstream of the internal combustion engine 1 is connected to the cylinder head 1a of the internal combustion engine 1. Each branch pipe of the exhaust branch pipe 45 communicates with the exhaust port 27 of the respective cylinder 21.

The exhaust branch pipe 45 is connected to an exhaust pipe 47 via an exhaust purifying catalyst 46. The downstream end of the exhaust pipe 47 is connected to a not-shown muffler. An air-fuel ratio sensor 48 for outputting an electric signal corresponding to the air-fuel ratio of the exhaust gas flowing through the exhaust branch pipe 45, in other words, the air-fuel ratio of the exhaust gas flowing into the exhaust purifying catalyst 46, is attached to the exhaust branch pipe 45.

The above-mentioned exhaust purifying catalyst may be any one of the catalysts described below or may be an appropriate combination of any of these catalysts. Namely, a three way catalyst for purifying hydrocarbons (HC), carbon monoxide (CO), and nitrogen oxides (NOx) in the exhaust gas when the air-fuel ratio of the exhaust gas flowing into the exhaust purifying catalyst 46 is a predetermined air-fuel ratio close to a stoichiometric air-fuel ratio; an occlusion reduction type NOx catalyst for occluding nitrogen oxides (NOx) in the exhaust gas when the air-fuel ratio of the exhaust gas flowing into the exhaust purifying catalyst 46 is a lean air-fuel ratio, and for reducing and purifying as it discharges occluded nitrogen oxides (NOx) when the air-fuel ratio of the exhaust gas flowing into the exhaust purifying catalyst 46 is a stoichiometric air-fuel ratio or is a rich air-fuel ratio; and a selection reduction type NOx catalyst for reducing and purifying nitrogen oxides (NOx) in the exhaust gas when the air-fuel ratio of the exhaust gas flowing into the exhaust purifying catalyst 46 is oxygen abundant and a predetermined reduction agent is present.

The internal combustion engine 1 is also provided with a crank position sensor 51 composed of a timing rotor 51a attached to the end portion of the crank shaft 23 and an electromagnetic pickup 51b attached to the cylinder block 1b in the vicinity of the timing rotor 51a, and a water temperature sensor 52 attached to the cylinder block 1b for detecting the temperature of the cooling water flowing through the cooling water passage 1c formed within the internal combustion engine 1.

An electronic control unit 20 (hereinafter referred to as an ECU) is also provided in the internal combustion engine 1 having the above-described structure for controlling the operating state of the internal combustion engine 1.

The ECU 20 is connected via electrical wiring to various sensors such as the throttle position sensor 41, the airflow meter 44, the air-fuel ratio sensor 48, the crank position sensor 51, the water temperature sensor 52, and the vacuum sensor 106. The ECU 20 is also connected via electrical wiring to an accelerator position sensor 43 for outputting an electric signal corresponding to the amount of operation of an accelerator pedal 42 mounted in a vehicle compartment. Output signals of each of these sensors are input into the ECU 20.

Figure 3:
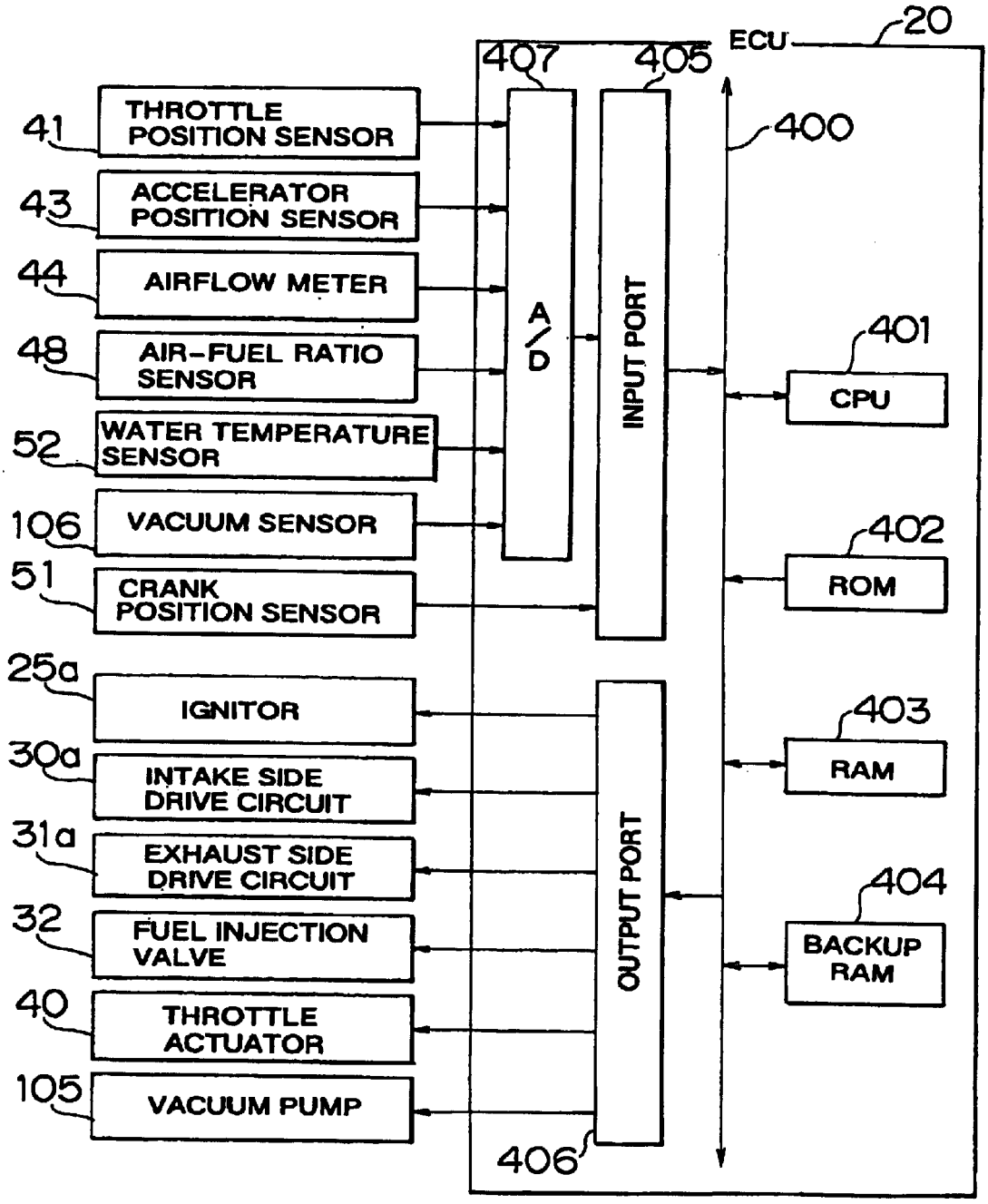
FIG. 3 is a block diagram showing the internal structure of an ECU according to the first embodiment.

The ignitor 25a, the intake side drive circuit 30a, the exhaust side drive circuit 31a, the fuel injection valve 32, the throttle actuator 40, the vacuum pump 105 and the like are connected via electrical wiring to the ECU 20. The ECU 20 is able to control the ignitor 25a, the intake side drive circuit 30a, the exhaust side drive circuit 31a, the fuel injection valve 32, the throttle actuator 40, and the vacuum pump 105 with output signal values of the various sensors as parameters. As is shown in FIG. 3, the ECU 20 is provided with a CPU 401, ROM 402, RAM 403, backup RAM 404, an input port 405, and an output port 406 which are connected to each other via a bi-directional bus 400. The ECU 20 is also provided with an A/D converter (A/D) 407 connected to the input port 405.

Sensors that output signals in an analog signal format, such as throttle position sensor 41, accelerator position sensor 43, airflow meter 44, air-fuel ratio sensor 48, water temperature sensor 52, and vacuum sensor 106, are connected via electrical wiring to the A/D 407. The A/D 407 converts the output signals of the above-mentioned sensors from the analog signal format to digital signal format for transmission to the input port 405.

The input port 405 is connected via the A/D 407 to the above-mentioned sensors that output signals in an analog signal format, such as throttle position sensor 41, accelerator position sensor 43, airflow meter 44, air-fuel ratio sensor 48, water temperature sensor 52, and vacuum sensor 106. The input port 405 is also connected to sensors that output signals in a digital signal format such as crank position sensor 51.

The input port 405 receives the output signals of the various sensors directly or via the A/D 407, and transmits these outputs signals to the CPU 401 and RAM 403 over the bi-directional bus 400.

The output port 406 is connected via electrical wiring to the ignitor 25a, intake side drive circuit 30a, exhaust side drive circuit 31a, fuel injection valve 32, throttle actuator 40, vacuum pump 105 and the like. The output port 406 receives a control signal output from the CPU 401 over the bi-directional bus 400, and transmits the control signal to the ignitor 25a, intake side drive circuit 30a, exhaust side drive circuit 31a, fuel injection valve 32, throttle actuator 40, or vacuum pump 105.

The ROM 402 stores a brake booster negative pressure control routine for accumulating operating negative pressure in the brake booster 106, in addition to storing application programs such as: a fuel injection amount control routine for deciding the fuel injection amount; a fuel injection timing control routine for deciding the fuel injection timing; an intake valve opening/closing timing control routine for deciding the opening and closing timing of the intake valve 28; an intake valve opening amount control routine for deciding the amount of the valve opening of the intake valve 28; an exhaust valve opening/closing timing control routine for deciding the opening and closing timing of the exhaust valve 29; an exhaust valve opening amount control routine for deciding the amount of the valve opening of the exhaust valve 29; an ignition timing control routine for deciding the ignition timing; and a throttle opening amount control routine for deciding the opening amount of the throttle valve 39.

The ROM 402 stores various control maps in addition to the above application programs. Examples of these control maps include: a fuel injection amount control map showing the relationship between the operating state of the internal combustion engine 1 and the fuel injection amount; a fuel injection timing control map showing the relationship between the operating state of the internal combustion engine 1 and the fuel injection timing; an intake valve opening/closing timing control map showing the relationship between the operating state of the internal combustion engine 1 and the valve opening/closing timing of the intake valve 28; an intake valve opening amount control map showing the relationship between the operating state of the internal combustion engine 1 and the valve opening amount of the intake valve 28; an exhaust valve opening/closing timing control map showing the relationship between the operating state of the internal combustion engine 1 and the opening and closing timing of the exhaust valve 29; an exhaust valve opening amount control map showing the relationship between the operating state of the internal combustion engine 1 and the valve opening amount of the exhaust valve 29; an ignition timing control map showing the relationship between the operating state of the internal combustion engine 1 and the ignition timing; and a throttle opening amount control map showing the relationship between the operating state of the internal combustion engine 1 and the opening amount of the throttle valve 39.

The RAM 403 stores output signals of each sensor, calculation results of the CPU 401, and the like. An example of a calculation result is the number of engine revolutions calculated on the basis of output signals from the crank position sensor 51. The data stored in the RAM 403 (the data such as output signals of each sensor and calculation results of the CPU 401) are rewritten as the latest data each time the crank position sensor 51 outputs a signal.

The backup RAM 404 is non-volatile memory that retains data even after the internal combustion engine 1 has stopped operating. The backup RAM 404 stores learning values relating to various controls, and the like.

The CPU 401 operates in accordance with the application programs stored in the ROM 402, and performs the brake booster negative pressure control, in addition to the fuel injection control, intake valve opening and closing control, exhaust valve opening and closing control, and ignition control.

The brake booster negative pressure control according to the present embodiment will now be described.

In the brake booster negative pressure control, the CPU 401 actuates the vacuum pump 105 so as to supply negative pressure to the brake booster 100, when predetermined conditions are satisfied. Examples of the predetermined conditions are as follows: a predetermined time period or more has passed since the negative pressure was finally supplied from the vacuum pump 105 to the brake booster 100; the vehicle has run a predetermined distance or more since the negative pressure was finally supplied from the vacuum pump 105 to the brake booster 100; and the negative pressure within the brake booster 100 is insufficient. Herein, an example will be described in which the vacuum pump 105 is actuated to supply the negative pressure to the brake booster 105, when the negative pressure within the brake booster 100 is insufficient.

Figure 4:
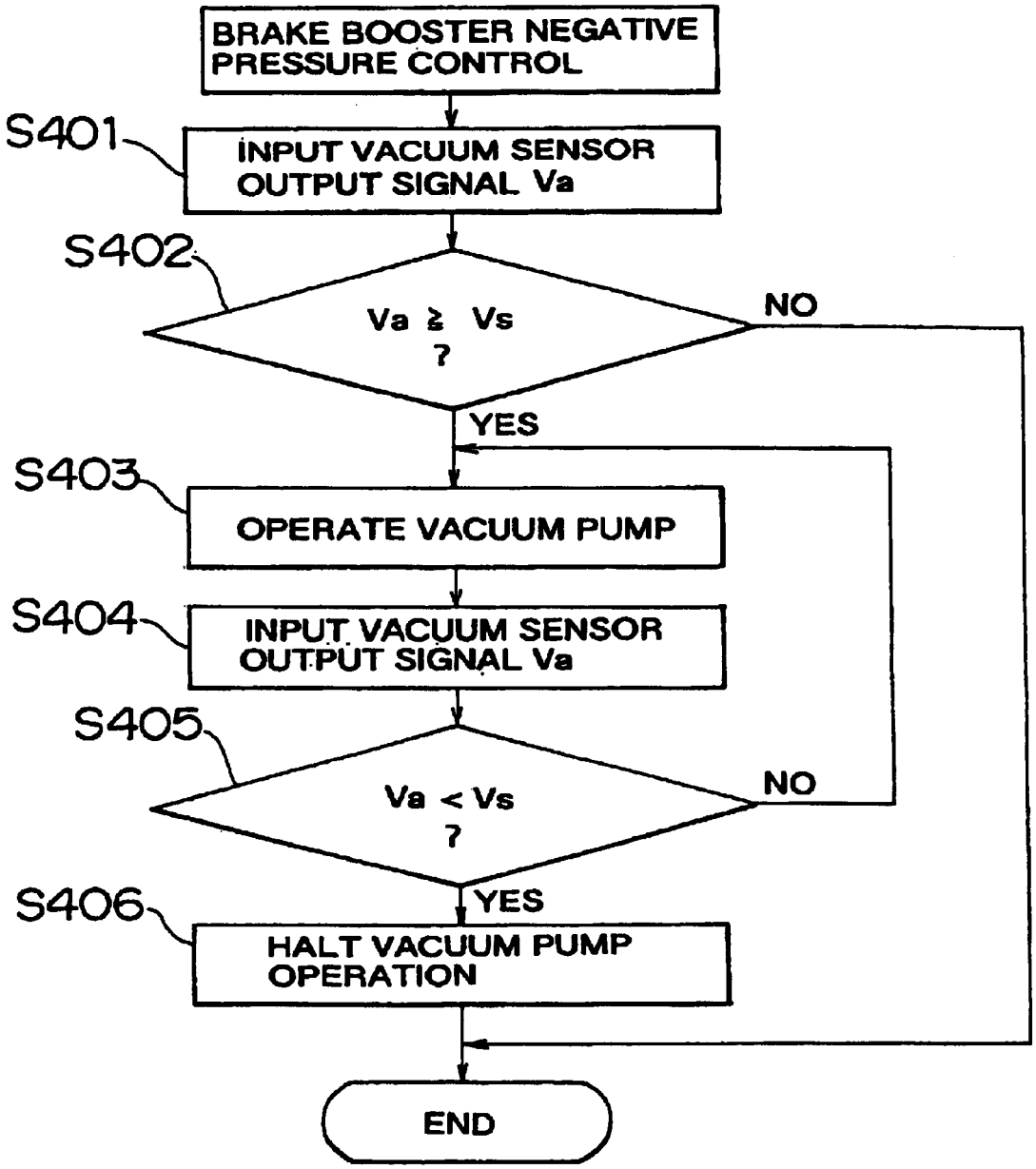
FIG. 4 is a flow chart showing a brake booster negative pressure control routine according to the first embodiment.

The CPU 401 performs a brake booster negative pressure control routine such as that shown in FIG. 4 whenever brake booster negative pressure control is performed. This brake booster negative pressure control routine is stored in advance in the ROM 402 and is repeatedly performed by the CPU 401 at predetermined times (for example, each time the crank position sensor 51 emits a pulse signal).

In the brake booster negative pressure control routine, in step S401, the CPU 401 firstly reads from the RAM 403 an output signal value Va of the vacuum sensor 106.

In step S402, the CPU 401 determines whether or not the output signal value Va read out in step S401 is equal to or greater than a maximum value Vs of the negative pressure needed for the operation of the brake booster 100 (namely, whether or not the extent of the negative pressure Va is equal to or less than the extent of the negative pressure Vs).

If it is determined in step S402 that the output signal value Va is less than the maximum value Vs, the CPU 401 decides that sufficient negative pressure for the operation of the brake booster 100 is secured inside the brake booster 100 and temporarily halts the current routine.

If, on the other hand, it is determined in step S402 that the output signal value Va is equal to or greater than the maximum value Vs, the CPU 401 decides that there is insufficient negative pressure for the operation of the brake booster 100 inside the brake booster 100 and the routine proceeds to step S403.

In step S403, the CPU 401 applies a drive current to the vacuum pump 105 thus causing the vacuum pump 105 to operate. In this case, the vacuum pump 105 suctions out the air inside the brake booster 100 resulting in the extent of the negative pressure inside the brake booster 100 being increased.

In step S404, a new output signal value Va of the vacuum sensor 106 is input into the CPU 401.

In step S405, the CPU 401 determines whether or not the output signal value Va input in step S404 has been reduced to be less than the maximum value Vs of the negative pressure needed for the operation of the brake booster 100.

If it is determined in step S405 that the output signal value Va has not been reduced to be less than the maximum value Vs, the CPU 401 once more performs the processing from step S403 and subsequent steps.

If, on the other hand, it is determined in step S405 that the output signal value Va has been reduced to be less than the maximum value Vs, the CPU 401 proceeds to step S406 where the application of the drive current to the vacuum pump 105 is stopped thereby stopping the operation of the vacuum pump 105. Once it has completed the processing of step S406, the CPU 401 temporarily ends the processing of the current routine.

In this way, the negative pressure supply device according to the invention is realized by the CPU 401 controlling the vacuum pump 105 according to the brake booster negative pressure control routine.

Accordingly, according to the internal combustion engine having an electromagnetic valve according to the present embodiment, because it is possible to supply operating negative pressure to the brake booster 100 without relying on the electromagnetic mechanism, it becomes possible to ensure the negative pressure needed for the operation of the brake booster 100 without there being any effect on the operating state of the internal combustion engine 1.

Note that, in the present embodiment, the example described was one in which the negative pressure inside the brake booster 100 was detected at predetermined intervals, however, it is also possible to detect the negative pressure inside the brake booster 100 so long as an engine operating state in which there is no intake pipe negative pressure generated inside the surge tank 34 continues.

Moreover, in the present embodiment, an electromagnetic valve train in which both intake and exhaust valves are driven to open and, close using the electromagnetic force is exemplified as the variable valve train according to the invention. However, only one of the intake and exhaust valves may be formed with the electromagnetic valve train.

Moreover, in the present embodiment, an electromagnetic valve train in which the intake and exhaust valves are driven to open and close using the electromagnetic force is exemplified as the variable valve train according to the invention. However, the variable valve train according to the invention may be any one of the variable valve trains described below or may be an appropriate combination of these variable valve trains. Namely, a hydraulic variable valve train using hydraulic pressure instead of the electromagnetic force; and a mechanical variable valve train which, in an internal combustion engine provided with a camshaft that drives intake and exhaust valves to open and close using the rotation force of a crankshaft, adjusts the opening and closing timing of the intake and exhaust valves by altering the rotation phase of the camshaft relative to the crankshaft.

<Second Embodiment>

The second embodiment of the internal combustion engine having an electromagnetic valve according to the invention will be described referring to FIGS. 5 to 7. Here, structural elements that are different from the above first embodiment will be described and the description of the same structural elements will be omitted.

In the above described first embodiment, an example was described in which the operating negative pressure is supplied to the brake booster as negative pressure mechanism using a vacuum pump as negative pressure supply device according to the invention. In the present embodiment, however, an example is described in which the negative pressure for the operation of the brake booster is generated using a throttle valve and a variable valve train.

Figure 5:
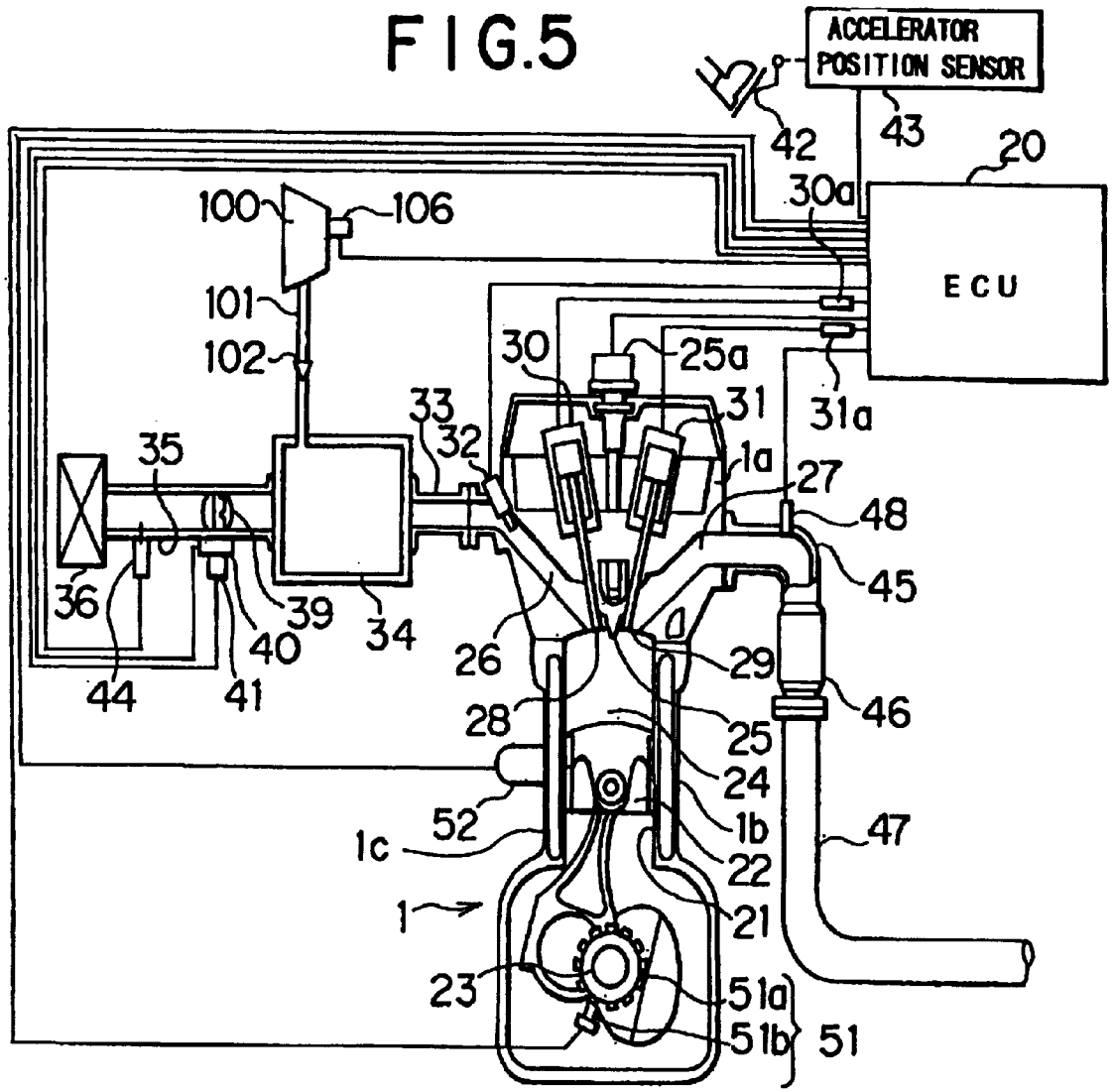
FIG. 5 is a diagram showing the schematic structure of an internal combustion engine having a variable valve train according to the second embodiment.

FIG. 5 is a diagram showing the schematic structure of the internal combustion engine having a variable valve train according to the present embodiment.

In the internal combustion engine 1 according to the present embodiment, the negative pressure passage 101 connecting the surge tank 34 and the brake booster 100 is provided only with the unidirectional valve 102 for permitting the flow of air from the brake booster 100 side to the surge tank 34 side and for cutting off the flow of air therefrom to the brake booster 100 side.

Figure 6:
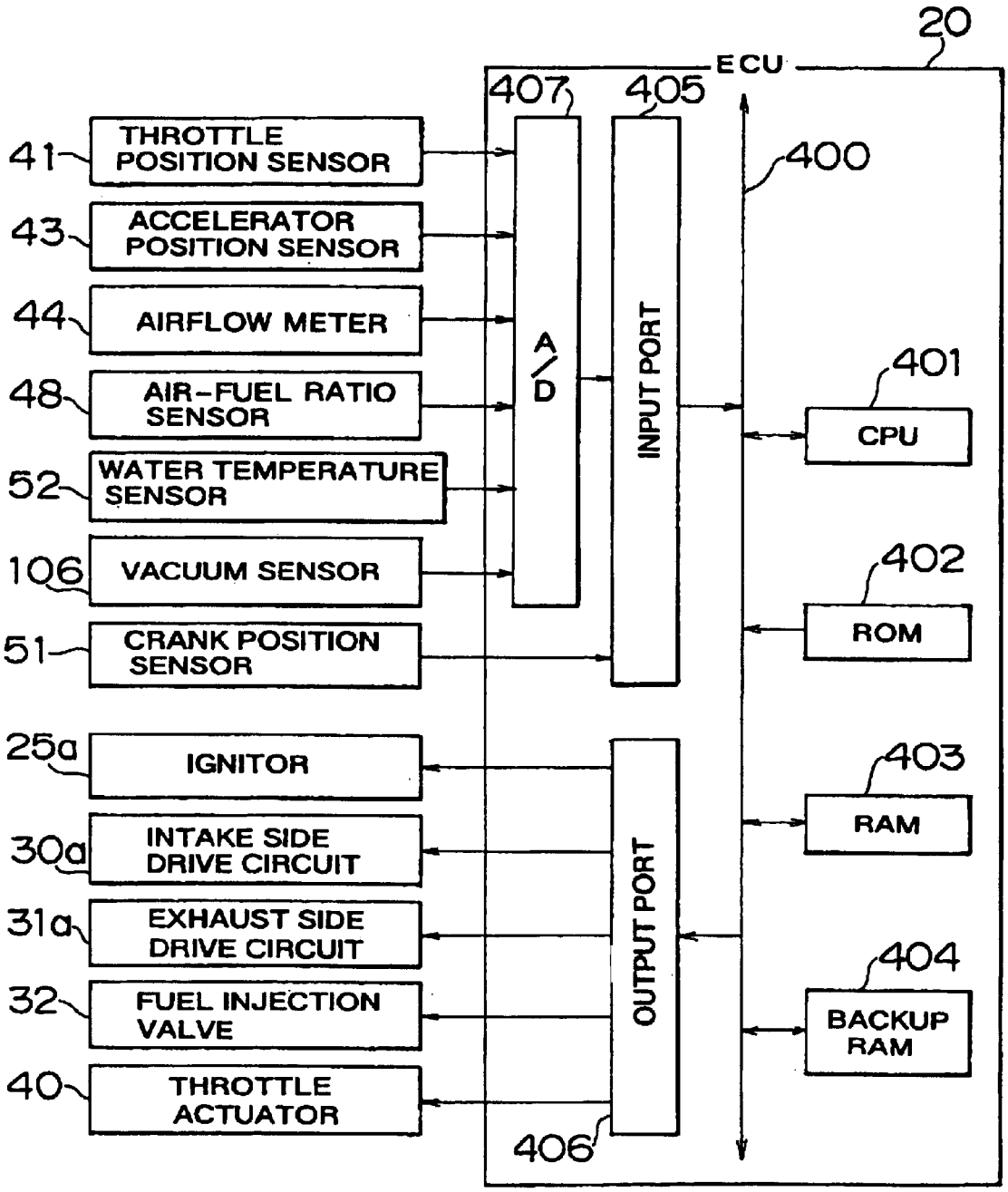
FIG. 6 is a block diagram showing the internal structure of an ECU according to the second embodiment.

As is shown in FIG. 6, the throttle position sensor 41, the accelerator position sensor 43, the air flow meter 44, the air-fuel ratio sensor 48, the crank position sensor 51, the water temperature sensor 52, and the vacuum sensor 106 are connected via electrical wiring to the ECU 20 provided in the internal combustion engine 1 having the above described structure. Output signals of these sensors are input to the ECU 20.

The ignitor 25a, the intake side drive circuit 30a, the exhaust side drive circuit 31a, the fuel injection valve 32, and the throttle actuator 40 are connected via electrical wiring to the ECU 20. The ECU 20 is able to control the ignitor 25a, the intake side drive circuit 30a, the exhaust side drive circuit 31a, the fuel injection valve 32, and the throttle actuator 40 with output signal values of the various sensors as parameters.

The ROM 402 stores a brake booster negative pressure control routine for accumulating operating negative pressure in the brake booster 100, in addition to storing application programs such as: a fuel injection amount control routine for deciding the fuel injection amount; a fuel injection timing control routine for deciding the fuel injection timing; an intake valve opening/closing timing control routine for deciding the opening and closing timing of the intake valve 28; an intake valve opening amount control routine for deciding the amount of the valve opening of the intake valve 28; an exhaust valve opening/closing timing control routine for deciding the opening and closing timing of the exhaust valve 29; an exhaust valve opening amount control routine for deciding the amount of the valve opening of the exhaust valve 29; an ignition timing control routine for deciding the ignition timing; and a throttle opening amount control routine for deciding the opening amount of the throttle valve 39.

The ROM 402 stores various control maps in addition to the above application programs. Examples of these control maps includes: a fuel injection amount control map showing the relationship between the operating state of the internal combustion engine 1 and the fuel injection amount; a fuel injection timing control map showing the relationship between the operating state of the internal combustion engine 1 and the fuel injection timing; an ignition timing control map showing the relationship between the operating state of the internal combustion engine 1 and the ignition timing; an intake valve opening/closing timing control map showing the relationship between the operating state of the internal combustion engine 1 and the opening and closing timing of the intake valve 28; an intake valve opening amount control map showing the relationship between the operating state of the internal combustion engine 1 and the valve opening amount of the intake valve 28; an exhaust valve opening/closing timing control map showing the relationship between the operating state of the internal combustion engine 1 and the opening and closing timing of the exhaust valve 29; an exhaust valve opening amount control map showing the relationship between the operating state of the internal combustion engine 1 and the valve opening amount of the exhaust valve 29; and a throttle opening amount control map showing the relationship between the operating state of the internal combustion engine 1 and the opening amount of the throttle valve 39.

In this case, the CPU 401 operates in accordance with the application programs stored in the ROM 402 and performs the brake booster negative pressure control in addition to the fuel injection control, the intake valve opening and closing control, the exhaust valve opening and closing control, the ignition control, and the throttle control.

The brake booster negative pressure control according to the present embodiment will now be described.

In the brake booster negative pressure control according to the present embodiment, the CPU 401 controls the intake side electromagnetic drive mechanism 30, exhaust side electromagnetic drive mechanism 31, and throttle valve 39 so as to generate intake valve negative pressure within the surge tank 34, when predetermined conditions are satisfied.

Examples of the predetermined conditions are as follows: a predetermined time period or more has passed since the intake side negative pressure was finally generated within the surge tank 34; the vehicle has run a predetermined distance or more since the intake pipe negative pressure was finally generated within the surge tank 34; and the vehicle is in a decelerating running state. Herein, an example will be described in which the intake pipe negative pressure is generated within the surge tank 34 when the vehicle is in a decelerating running state.

Figure 7:
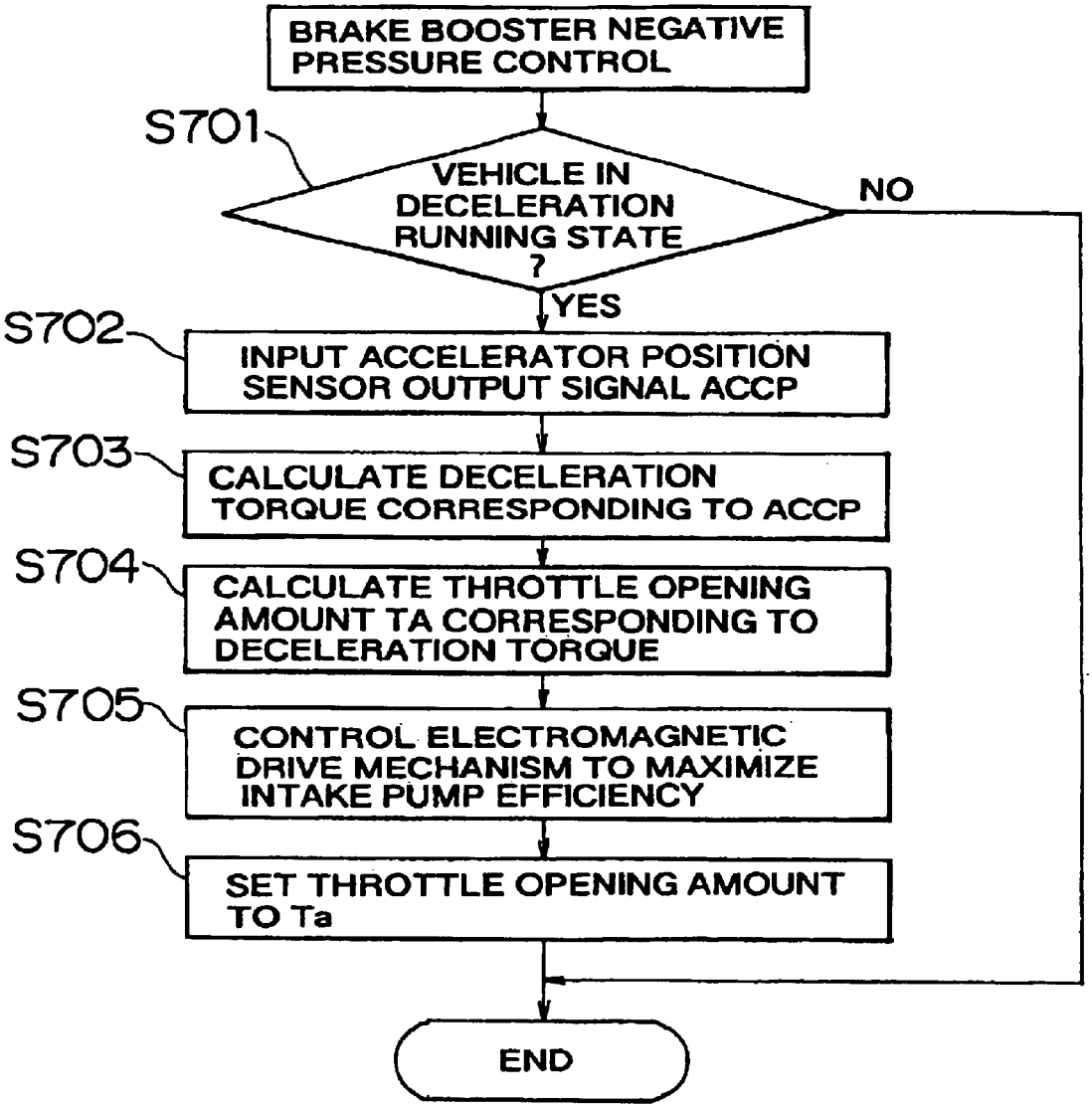
FIG. 7 is a flow chart showing a brake booster negative pressure control routine according to the second embodiment.

The CPU 401 performs a brake booster negative pressure control routine such as that shown in FIG. 7 whenever brake booster negative pressure control is performed. This brake booster negative pressure control routine is stored in advance in the ROM 402 and is repeatedly performed by the CPU 401 at predetermined intervals (for example, each time the crank position sensor emits a pulse signal).

In the brake booster negative pressure control routine, in step S701, the CPU 401 firstly determines whether or not the vehicle having the internal combustion engine 1 mounted thereon is in a decelerating running state. The method used to determine whether or not the vehicle is in a decelerating running state may be, for example, a method in which the vehicle is determined to be in a decelerating running state when the output signal value of the accelerator position sensor 43 (the accelerator opening amount) is changing in the valve closing direction. Alternatively, the method used may be a method in which the vehicle is determined to be in a decelerating running state when the running speed of the vehicle is changing in a decelerating direction, a method in which the vehicle is determined to be in a decelerating running state when the number of engine revolutions is changing in a decreasing direction, or a method in which the vehicle is determined to be in a decelerating running state when the brake pedal is in a state of being operated.

If it is determined in step S701 that the vehicle is not in a decelerating running state, the CPU 401 temporarily halts the current routine.

If, on the other hand, it is determined in step S701 that the vehicle is in a decelerating running state, the CPU 401 proceeds to step S702 where the output signal value ACCP of the accelerator position sensor 43 (the accelerator opening amount) is input.

In step S703, the CPU 401 calculates the size of the deceleration torque, in other words, the size of the engine brake force corresponding to the accelerator opening amount ACCP input in step S701.

Note that it is also possible to experimentally determine in advance the relationships between the accelerator opening amount and the deceleration torque for the internal combustion engine 1 and to map the relationships between the accelerator opening amount and the deceleration torque and store them in the ROM 402. In this case, the CPU 401 accesses the map with the accelerator opening amount ACCP as a parameter and calculates the deceleration torque corresponding to the accelerator opening amount ACCP.

In step S704, the CPU 401 calculates a throttle opening amount Ta corresponding to the deceleration torque calculated in step S703. In this case as well, it is possible to experimentally determine in advance the relationships between the throttle opening amount Ta and the deceleration torque for the internal combustion engine 1 and to map the relationships between the throttle opening amount Ta and the deceleration torque and store them in the ROM 402.

In step S705, the CPU 401 controls the intake side drive circuit 30a and/or the exhaust side drive circuit 31a so as to maximize the pump efficiency that affects the air intake of the internal combustion engine 1. Namely, the CPU 401 controls the intake side drive circuit 30a and/or the exhaust side drive circuit 31a such that the opening and closing timing and/or opening amount of at least one of the intake valve 28 and exhaust valve 29 are optimized for the internal combustion engine 1 to pump out the new air into the surge tank 34.

At that time, because the pump efficiency affecting the air intake of the internal combustion engine 1 differs depending on the number of engine revolutions, the CPU 401 may calculate the opening and closing timing and/or opening amount of the intake valve 28 and/or the exhaust valves 29 using the number of engine revolutions as a parameter.

In step S706, the CPU 401 controls the throttle actuator 40 such that the throttle valve 39 is opened to the throttle opening amount Ta calculated in step S704.

In this case, the optimum deceleration torque (engine brake force) corresponding to the amount that the accelerator pedal 42 is operated by the driver (the accelerator opening amount) is generated in the internal combustion engine 1.

Further, because the throttle valve 39 is driven in a valve opening direction in addition to the pump efficiency affecting the air intake of the internal combustion engine 1 being set to the maximum, intake pipe negative pressure is generated in the surge tank 34. As a result, the intake pipe negative pressure within the surge tank 34 is applied to the brake booster 100 via the negative pressure passage 101 and sufficient negative pressure is secured for the operation of the brake booster 100.

Note that, in the brake booster negative pressure control routine, when the accelerator opening amount is fully closed, it is also possible for the CPU 401 to set the throttle opening amount Ta at fully closed and stop performing the fuel injection so that the deceleration torque is set to the maximum.

In this way, the negative pressure generating device according to the invention is realized by the CPU 401 controlling the intake side electromagnetic drive mechanism 30, exhaust side electromagnetic drive mechanism 31 and throttle valve 39 according to the brake booster negative pressure control routine.

Consequently, according to the internal combustion engine having a variable valve train according to the present embodiment, it is possible to secure negative pressure for the operation of the brake booster 100 while supplying sufficient deceleration torque required by the driver.

Note that, in the present embodiment, the variable valve train according to the invention may be an electromagnetic valve train in which both intake and exhaust valves are driven to open and close using the electromagnetic force.

Moreover, in the present embodiment, the variable valve train according to the invention may be any one of the variable valve trains described below or may be an appropriate combination of these variable valve trains. Namely, a hydraulic variable valve train using hydraulic pressure instead of the electromagnetic force; and a mechanical variable valve train which, in an internal combustion engine provided with a camshaft that drives intake and exhaust valves to open and close using the rotation force of a crankshaft, adjusts the opening and closing timing of the intake and exhaust valves by altering the rotation phase of the camshaft relative to the crankshaft.

<Third Embodiment>

The third embodiment of the internal combustion engine having a variable valve train according to the invention will be described referring to FIG. 8. Here, structural elements that are different from the above second embodiment will be described and the description of the same structural elements will be omitted.

In the above described second embodiment, an example was described in which negative pressure for the operation of the brake booster is secured by using the throttle valve 39 and the electromagnetic valve train in combination when the vehicle is in a deceleration running state. In the present embodiment, however, an example is described in which negative pressure for the operation of the brake booster is secured by using the throttle valve and the electromagnetic valve train in combination in case of insufficient negative pressure inside the brake booster.

Figure 8:
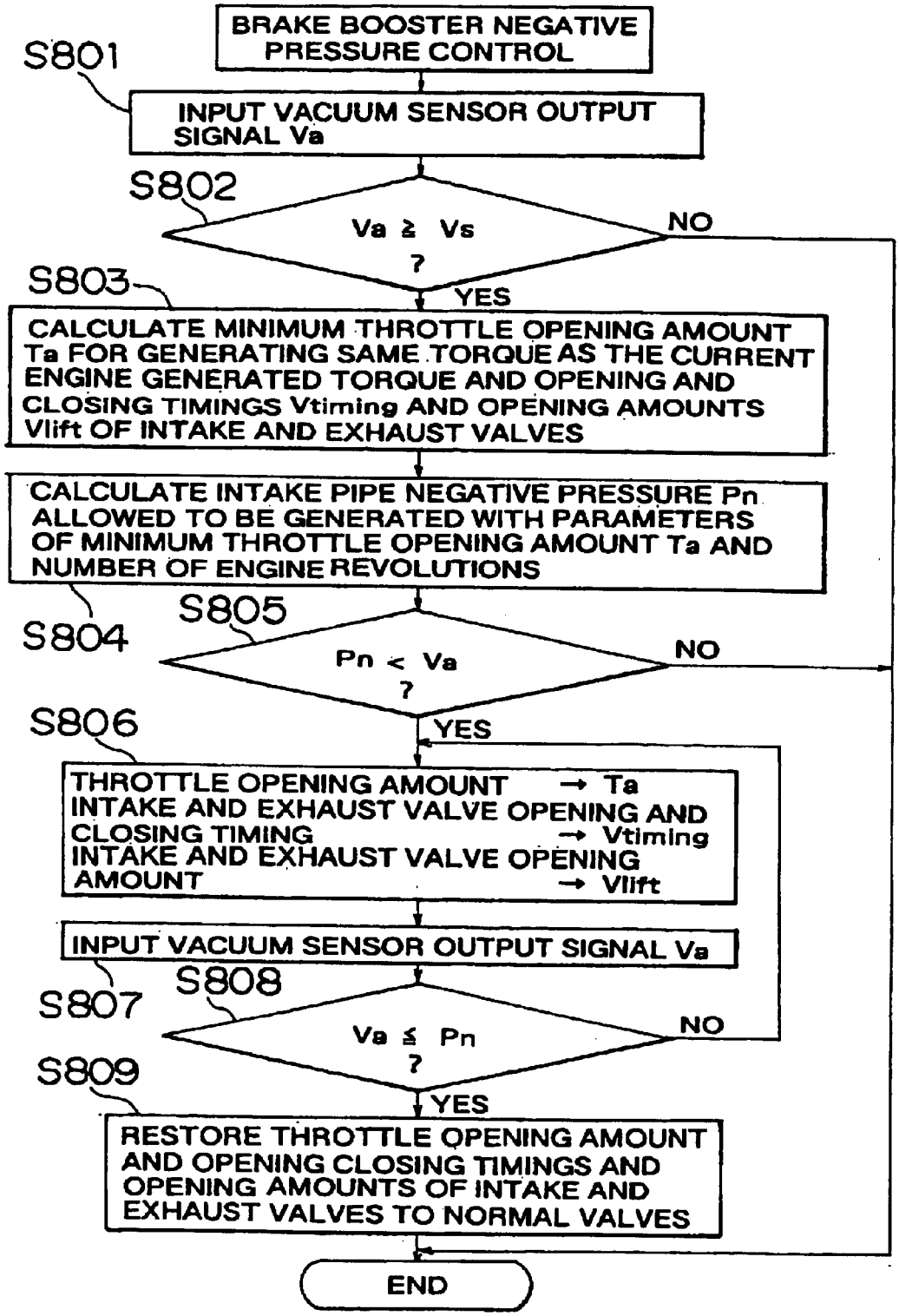
FIG. 8 is a flow chart showing a brake booster negative pressure control routine according to the third embodiment.

In the present embodiment, the CPU 401 of the ECU 20 performs a brake booster negative pressure control routine such as that shown in FIG. 8, when securing negative pressure for the operation of the brake booster 100. This brake booster negative pressure control routine is stored in advance in the ROM 402 and is repeatedly performed at predetermined intervals (for example, each time the crank position sensor 51 emits a pulse signal) by the CPU 401.

In the brake booster negative pressure control routine, the CPU 401 firstly, in step S801, reads an output signal value Va of the vacuum sensor 106 from the RAM 403.

In step S802, the CPU 401 determines whether or not the output signal value Va input in step S801 is equal to or greater than a maximum value Vs of the negative pressure needed for the operation of the brake booster 100 (namely, whether or not the extent of the negative pressure Va is equal to or less than the extent of the negative pressure Vs).

If it is determined in step S802 that the output signal value Va is less than the maximum value Vs, the CPU 401 decides that sufficient negative pressure for the operation of the brake booster 100 is secured inside the brake booster 100 and temporarily halts the current routine.

If, on the other hand, it is determined in step S802 that the output signal value Va is equal to or greater than the maximum value Vs, the CPU 401 decides that there is insufficient negative pressure for the operation of the brake booster 100 inside the brake booster 100 and the routine proceeds to step S803.

In step S803, the CPU 401 calculates the minimum throttle opening amount Ta for generating the same torque as that currently being generated by the internal combustion engine 1, and the opening and closing timings Vtiming and opening amounts Vlift of the intake and exhaust valves 28 and 29. Namely, the CPU 401 calculates the minimum throttle opening amount Ta and the opening and closing timings Vtiming and opening amount Vlift of the intake and exhaust valves 28 and 29 capable of securing substantially the same intake air amount as the current intake air amount in the internal combustion engine 1.

In step S804, the CPU 401 calculates the intake pipe negative pressure Pn that can be generated by the throttle opening angle Ta calculated in step S803 and the current number of engine revolutions.

In step S805, the CPU 401 determines whether or not the intake pipe negative pressure Pn calculated in step S804 is lower than the output signal value Va input in step S801.

If it is determined in step S805 that the intake pipe negative pressure Pn calculated in step S804 is lower than the output signal value Va, the CPU 401 proceeds to step S806 where the throttle actuator 40 is controlled such that the throttle valve 39 is opened to the throttle opening angle Ta. The CPU 401 also controls the intake side drive circuit 30a and the exhaust side drive circuit 31a such that the actual opening and closing timings and opening amounts of the intake and exhaust valves 28 and 29 are set at the opening and closing timings Vtiming and opening amounts Vlift.

Next, the CPU 401 proceeds to step S807 where the output signal value Va of the vacuum sensor 106 is input once again.

In step S808, the CPU 401 determines whether or not the output signal value Va input in step S807 has decreased to equal to or less than the intake pipe negative pressure Pn.

If it is determined in step S808 that the output signal value Va input in step S807 has not decreased to be equal to or less than the intake pipe negative pressure Pn, the CPU 401 repeats the above processing from step S806 and the subsequent steps.

If, on the other hand, it is determined in step S808 that the output signal value Va input in step S807 has decreased to equal to or less than the intake pipe negative pressure Pn, the CPU 401 proceeds to step S809 where the throttle actuator 40 is controlled such that the throttle valve 39 is opened to the normal opening amount, and the intake side electromagnetic drive mechanism 30 and the exhaust side electromagnetic drive mechanism 31 are controlled such that the actual opening and closing timings and opening amounts of the intake and exhaust valves 28 and 29 are restored to the normal opening and closing timings and opening amounts.

When the CPU 401 has completed the processing of step S809, the processing of the current routine is temporarily ended.

Note that, in step S802, if it is determined that the output signal value Va is equal to or greater than the maximum value Vs of the negative pressure needed for the operation of the brake booster 100, the CPU 401 temporarily ends the processing of the current routine. The CPU 401 may then proceed to step S701 described in the above second embodiment so as to perform such brake booster negative pressure control as described in the above second embodiment at the time the vehicle is rendered in a deceleration running state.

As described above, it is possible to secure negative pressure for the operation of the brake booster 100 without causing torque variations in the internal combustion engine 1 by the CPU 401 performing the brake booster negative pressure control routine.

<Fourth Embodiment>

Hereinafter, the fourth embodiment of the internal combustion engine 1 having a variable valve train according to the invention will be described with reference to FIGS. 9 to 12. Herein, an electromagnetic valve train for driving intake and exhaust valves to open and close using electromagnetic force will be described as an example of the variable valve train according to the invention. Also, an evaporation fuel processing apparatus will be described as an example of the negative pressure mechanism according to the invention.

Figure 9:
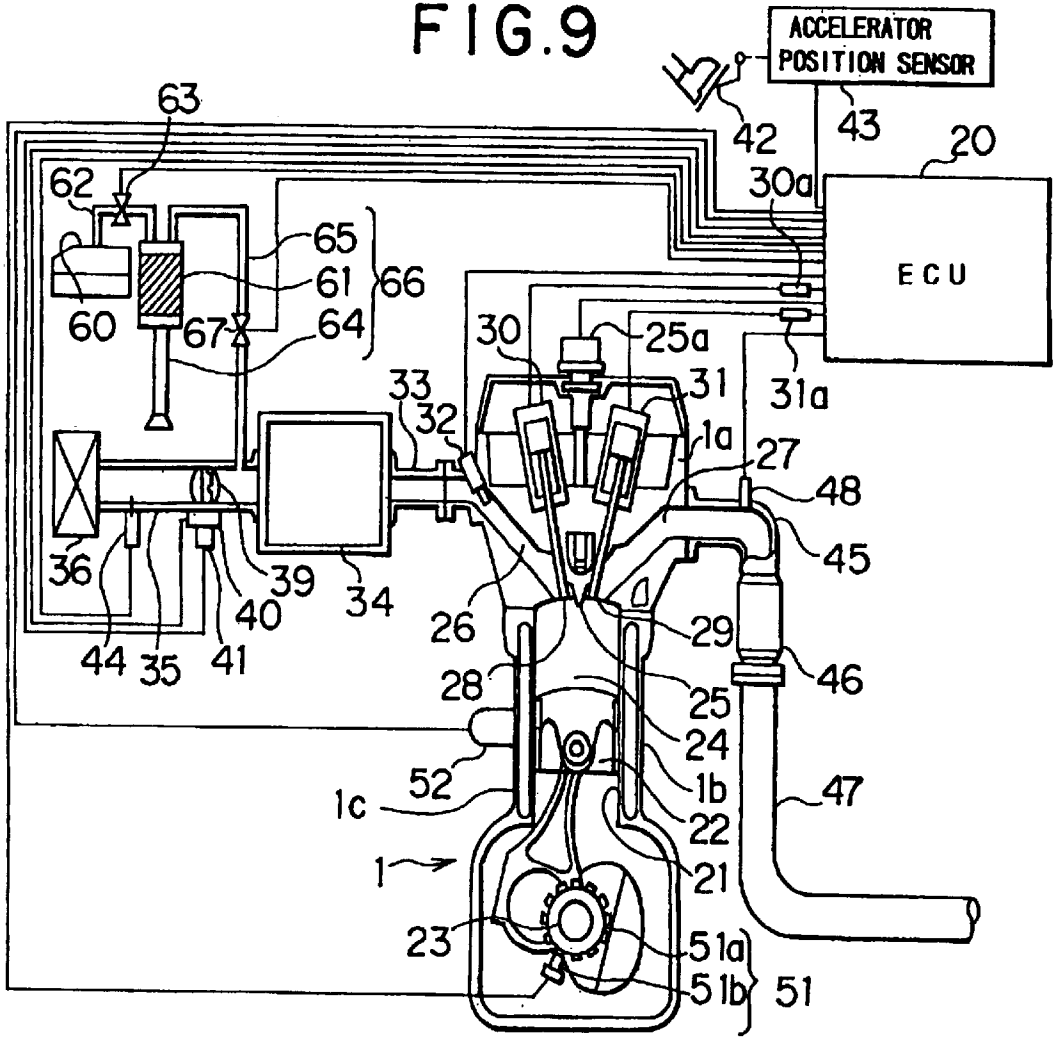
FIG. 9 is a diagram showing the schematic structure of an internal combustion engine having a variable valve train according to the fourth embodiment.

FIG. 9 is a diagram showing the schematic structure of an internal combustion engine and an intake and exhaust system thereof according to the present embodiment. The internal combustion engine 1 shown in FIG. 9 is a water-cooled four-stroke cycle gasoline engine provided with four cylinders 21.

The internal combustion engine 1 is provided with a cylinder block 1b in which the four cylinders 21 and a cooling water passage 1c are formed, and a cylinder head 1a fixed to the top of the cylinder block 1b.

A crankshaft 23 as an engine output shaft is rotatably supported by the cylinder block 1b. This crankshaft 23 is linked through connecting rods to pistons 22 slidably loaded within the respective cylinders 21.

Combustion chambers 24 are defined above the pistons 22 of the respective cylinders 21 by the top surface of the piston 22 and the side walls of the cylinder head 1a. Spark plugs 25 are attached to the cylinder head 1a so as to face the combustion chambers 24 of the respective cylinders 21. An ignitor 25a for applying a drive current in the spark plugs 25 is connected to the spark plugs 25.

Two open ends of intake ports 26 and two open ends of exhaust ports 27 are formed in the cylinder head 1a at positions facing the combustion chamber 24 of each cylinder 21. Intake valves 28 for opening and closing the respective open ends of the intake ports 26 and exhaust valves 29 for opening and closing the respective open ends of the exhaust ports 27 are provided in the cylinder head 1a so as to be able to advance and retract freely.

The cylinder head 1a is provided with the same number of electromagnetic drive mechanisms 30 as that of intake valves 28 for advancing and retracting the respective intake valves 28 by using electromagnetic force generated in response to application of exciting current (hereinafter referred to as intake side electromagnetic drive mechanisms 30). A drive circuit 30a for applying exciting current to the intake side electromagnetic drive mechanisms 30 (hereinafter referred to as intake side drive circuit 30a) is electrically connected to each intake side electromagnetic drive mechanism 30.

The cylinder head 1a is provided with the same number of electromagnetic drive mechanisms 31 as that of exhaust valves 29 for advancing and retracting the respective exhaust valves 29 by using electromagnetic force generated in response to application of exciting current (hereinafter referred to as exhaust side electromagnetic drive mechanisms 31). A drive circuit 31a for applying exciting current to the exhaust side electromagnetic drive mechanisms 31 (hereinafter referred to as exhaust side drive circuit 31a) is electrically connected to each exhaust side electromagnetic drive mechanism 31.

The above-mentioned intake side electromagnetic drive mechanisms 30, intake side drive circuit 30a, exhaust side electromagnetic drive mechanisms 31 and exhaust side drive circuit 31a correspond to the variable valve train according to the invention.

Here, the specific structure of the intake side electromagnetic drive mechanism 30 and the exhaust side electromagnetic drive mechanism 31 will be described. Note that, because the intake side electromagnetic drive mechanism 30 and the exhaust side electromagnetic drive mechanism 31 have the same structure, only the intake side electromagnetic drive mechanism 30 will be exemplarily described.

Figure 10:
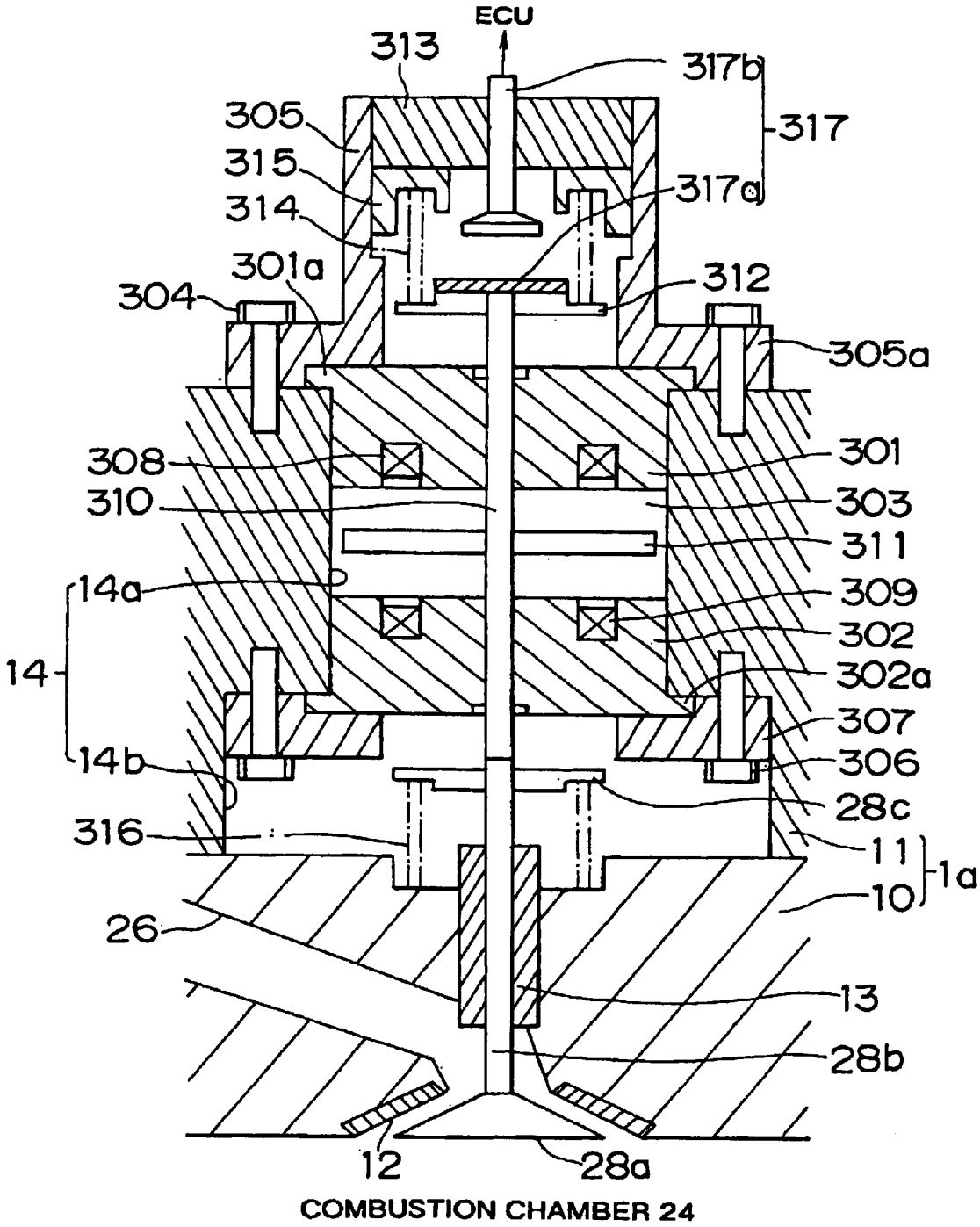
FIG. 10 is a diagram showing the internal structure of an electromagnetic drive mechanism on the intake side according to the fourth embodiment.

FIG. 10 is a cross sectional view showing the structure of the intake side electromagnetic drive mechanism 30. In FIG. 10, the cylinder head 1a of the internal combustion engine 1 is provided with a lower head 10 fixed to the top surface of the cylinder block 1b, and an upper head 11 provided on the lower head 10.

Two intake ports 26 per cylinder 21 are formed in the lower head 10, and a valve seat 12 in which a valve body 28a of the intake valve 28 is seated is provided at the open end of each intake port 26 that faces the combustion chamber 24.

A through hole having a circular cross section is formed in the lower head 10 so as to extend from the inner wall surface of each intake port 26 to the top surface of the lower head 10. A cylindrical valve guide 13 is inserted into each through hole. A valve shaft 28b of the intake valve 28 extends through the inner hole of the valve guide 13 so as to be able to advance and retract in the axial direction.

A core attachment hole 14 having a circular cross section is formed in the upper head 11 so as to have the same central axis as that of the valve guide 13. A lower portion 14b of the core attachment hole 14 has a diameter larger than that of an upper portion 14a thereof. Hereinafter, the lower portion 14b of the core attachment hole 14 is referred to as large diameter portion 14b, and the upper portion 14a of the core attachment hole 14 is referred to as small diameter portion 14a.

Ring-shaped first and second cores 301 and 302, each formed from a soft magnetic body, are axially fitted in series in the small diameter portion 14a with a predetermined gap 303 therebetween. Flanges 301a and 302a are respectively formed at the upper end of the first core 301 and the lower end of the second core 302. The first core 301 is fitted into the core attachment hole 14 from above, and the second core 302 is fitted therein from beneath. The first and second cores 301 and 302 are positioned by the flanges 301a and 302a abutting on the respective edge portions of the core attachment hole 14, whereby the predetermined gap 303 is retained therebetween.

A ring-shaped upper cap 305 is provided on the first core 301. This upper cap 305 is fixed to the top surface of the upper head 11 by means of bolts 304 extending through a flange portion 305 formed at the lower end of the upper cap 305. In this case, the lower end of the upper cap 305 including the flange portion 305a is fixed to the peripheral edge portion of the top surface of the first core 301 in an abutting manner, so that the first core 301 is fixed to the upper head 11.

On the other hand, a lower cap 307 formed from a ring-shaped body having an outer diameter substantially the same as the diameter of the large diameter portion 14b of the core attachment hole 14 is provided under the second core 302. By means of bolts 307 extending through the lower cap 307, the lower cap 307 is fixed to the downward-facing stepped surface of the stepped portion between the small diameter portion 14a and large diameter portion 14b. In this case, the lower cap 307 is fixed to the peripheral edge portion of the lower surface of the second core 302 in an abutting manner, so that the second core 302 is fixed to the upper head 11.

An electromagnetic coil 308 is held in a groove formed at the surface of the first core 301 facing the gap 303, and an electromagnetic coil 309 is held in a groove formed at the surface of the second core 302 facing the gap 303. The first and second electromagnetic coils 308 and 309 are located to face each other with the gap 303 therebetween. The first and second electromagnetic coils 308 and 309 are electrically connected to the intake side drive circuit 30a.

An armature 311 formed from a ring-shaped soft magnetic body having an outer diameter smaller than the inner diameter of the gap 303 is provided in the gap 303. A columnar armature shaft 310 vertically extending along the central axis of the armature 311 is fixed in a hollow portion of the armature 311. This armature shaft 310 extends through a hollow portion of the first core 301 up into the upper cap 305 at its upper end. The armature shaft 310 also extends through a hollow portion of the second core 302 down into the large diameter portion 14b at its lower end. Thus, the armature shaft 310 is held by the first and second cores 301 and 302 so as to be able to advance and retract in the axial direction.

A disk-shaped upper retainer 312 is bonded to the upper end portion of the armature shaft 310 extending into the upper cap 305, and an adjust bolt 313 is screwed into an upper opening of the upper cap 305. An upper spring 314 is provided between the upper retainer 312 and adjust bolt 313. A spring sheet 315 having an outer diameter substantially the same as the inner diameter of the upper cap 305 is interposed between the abut surfaces of the adjust bolt 313 and upper spring 314.

On the other hand, the upper end of the valve shaft 28b of the intake valve 28 abuts on the lower end of the armature shaft 310 extending into the large diameter portion 14b. A disk-shaped lower retainer 28c is bonded to the outer periphery of the upper end portion of the valve shaft 28b, and a lower spring 316 is provided between the lower surface of the lower retainer 28c and the upper surface of the lower head 10.

In the intake side electromagnetic drive mechanism 30 structured as such, when no exciting current is being applied from the intake side drive circuit 30a to the first and second electromagnetic coils 308 and 309, downward biasing force (i.e., in such a direction that opens the intake valve 28) is applied from the upper spring 314 to the armature shaft 310, as well as upward biasing force (i.e., in such a direction that closes the intake valve 28) is applied from the lower spring 316 to the intake valve 28. As a result, the armature shaft 310 and intake valve 28 abut on each other, and thus are held at predetermined positions in an elastically supported state, i.e., in a neutral state.

Note that the respective biasing forces of the upper spring 314 and lower spring 316 are set such that the neutral position of the armature 311 corresponds to the intermediate position between the first core 301 and second core 302 in the gap 303. If the neutral position of the armature 311 is displaced from the above-mentioned intermediate position due to initial tolerance, aging or the like of the components, the neutral position of the armature 311 can be adjusted with the adjust bolt 313 so as to correspond to the intermediate position.

Moreover, the respective axial lengths of the armature shaft 310 and valve shaft 28b are set such that the valve body 28a is held in the intermediate position between the fully open displacement end and the fully closed displacement end (hereinafter referred to as mid-open position) when the armature 311 is located at the intermediate position in the gap 303.

In the intake side electromagnetic drive mechanism 30, if an exciting current is applied from the intake side drive circuit 30a to the first electromagnetic coil 308, electromagnetic force is generated between the first core 301, first electromagnetic coil 308 and armature 311 so as to displace the armature 311 toward the first core 301. If an exciting current is applied from the intake side drive circuit 30a to the second electromagnetic coil 309, electromagnetic force is generated between the second core 302, second electromagnetic coil 309 and armature 311 so as to displace the armature 311 toward the second core 302.

As a result, by applying an exciting current from the intake side drive circuit 30a alternately to the first electromagnetic coil 308 and second electromagnetic coil 309 in the intake side electromagnetic drive, mechanism 30, the armature 311 is advanced and retracted, and thus the valve shaft 28b is driven to advance and retract as well as the valve body 28a is simultaneously driven to open and close.

At this time, the opening and closing timing of the intake valve 28 can be controlled by altering the magnitude and application timing of the exciting current to the first electromagnetic coil 308 and second electromagnetic coil 309.

A valve lift sensor 317 for detecting displacement of the intake valve 28 is also mounted to the intake side electromagnetic drive mechanism 30. This valve lift sensor 317 is comprised of a disk-shaped target 317a attached to the top surface of the upper retainer 312, and a gap sensor 317b mounted in the adjust bolt 313 so as to face the upper retainer 312.

In the valve lift sensor 317 structured as such, the target 317a is displaced integrally with the armature 311 of the intake side electromagnetic drive mechanism 30, so that the gap sensor 317b outputs an electric signal corresponding to the distance between the gap sensor 317b and target 317a.

An output signal value of the gap sensor 317b corresponding to the armature 311 being in the neutral state is pre-stored. Thus, displacement of the armature 311 and intake valve 28 can be specified by calculating a deviation of a current output signal value of the gap sensor 317b from the pre-stored output signal value.

Returning now to FIG. 9, an intake branch pipe 33 formed from four branch pipes is connected to the cylinder head 1a of the internal combustion engine 1, and each branch pipe of the intake branch pipe 33 communicates with the intake port 26 of the respective cylinder 21. Fuel injection valves 32 are attached to the cylinder head 1a at positions near the joint portion with the intake branch pipe 33 such that the nozzles thereof face the respective intake ports 26.

The intake branch pipe 33 is connected to a surge tank 34 for suppressing intake surges. An intake pipe 35 is connected to the surge tank 34. The intake pipe 35 is connected to an air cleaner box 36 for removing dust and impurities from the intake air.

An airflow meter 44 for outputting an electric signal corresponding to the mass of the air flowing through the intake pipe 35 (i.e., the mass of the intake air) is attached to the intake pipe 35. A throttle valve 39 for adjusting the flow rate of the intake air flowing through the intake pipe 35 is provided at a position downstream of the airflow meter 44 in the intake pipe 35.

The throttle valve 39 is provided with a throttle actuator 40 formed from a stepper motor or the like for driving the throttle valve 39 to open and close in accordance with the magnitude of the applied power, and a throttle position sensor 41 for outputting an electric signal corresponding to the opening amount of the throttle valve 39.

An exhaust branch pipe 45 formed from four branch pipes merged into a single collecting pipe at a position immediately downstream of the internal combustion engine 1 is connected to the cylinder head 1a of the internal combustion engine 1. Each branch pipe of the exhaust branch pipe 45 communicates with the exhaust port 27 of the respective cylinder 21.

The exhaust branch pipe 45 is connected to an exhaust pipe 47 via an exhaust purifying catalyst 46. The downstream end of the exhaust pipe 47 is connected to a not-shown muffler. An air-fuel ratio sensor 48 for outputting an electric signal corresponding to the air-fuel ratio of the exhaust gas flowing through the exhaust branch pipe 45, in other words, the air-fuel ratio of the exhaust gas flowing into the exhaust purifying catalyst 46, is attached to the exhaust branch pipe 45.

The exhaust purifying catalyst 46 may be any one of the catalysts described below or may be an appropriate combination of any of these catalysts. Namely, a three way catalyst for purifying hydrocarbons (HC), carbon monoxide (CO) and nitrogen oxides (NOx) in the exhaust gas when the exhaust gas flowing into the exhaust purifying catalyst 46 has a predetermined air-fuel ratio close to a stoichiometric air-fuel ratio; an occlusion reduction type NOx catalyst for occluding nitrogen oxides (NOx) in the exhaust gas when the exhaust gas flowing into the exhaust purifying catalyst 46 has a lean air-fuel ratio, and for reducing and purifying while discharging occluded nitrogen oxides (NOx) when the exhaust gas flowing into the exhaust purifying catalyst 46 has a stoichiometric air-fuel ratio or a rich air-fuel ratio; and a selection reduction type NOx catalyst for reducing and purifying nitrogen oxides (NOx) in the exhaust gas when the air-fuel ratio of the exhaust gas flowing into the exhaust purifying catalyst 46 is oxygen abundant and a predetermined reduction agent is present.

The internal combustion engine 1 is also provided with an evaporation fuel processing mechanism as the negative pressure mechanism according to the invention. This evaporation fuel processing mechanism is provided with a fuel tank 60, a charcoal canister 60 for temporarily storing the evaporation fuel generated in the fuel tank 60, and a negative pressure introducing passage 65 for introducing the evaporation fuel stored in the charcoal canister 61 to a portion downstream of the throttle valve 39 in the intake pipe 35.

The fuel tank 60 and charcoal canister 61 are connected to each other through an evaporation fuel passage 62. A tank pressure control valve 63 for opening and closing a flow path in the evaporation fuel passage 62 according to the pressure in the fuel tank 60 is provided in the evaporation fuel passage 62. The tank pressure control valve 63 is formed from a combination of positive and negative pressure valves. The positive pressure valve opens when the pressure in the fuel tank 60 becomes a first predetermined value or more due to increase in the amount of evaporation fuel. The negative pressure valve opens when the pressure in the fuel tank 60 becomes a second predetermined value (which is less than the first predetermined value) or less due to reduction in the amount of fuel.

In addition to the evaporation fuel passage 62 and negative pressure introducing passage 65, an atmospheric air introducing passage 64 is connected to the charcoal canister 61. This atmospheric air introducing passage 64 is opened to the atmosphere at its termination.

An electromagnetic valve 67 formed from a stepping motor or the like for adjusting the flow rate in the negative pressure introducing passage 65 is provided in the negative pressure introducing passage 65.

The atmospheric air introducing passage 64 and negative pressure introducing passage 65 communicating with each other through the charcoal canister 61 form a purge passage (hereinafter, the charcoal canister 61, atmospheric air introducing passage 64 and negative pressure introducing passage 65 are collectively referred to as purge passage 66). The purge passage 66 and electromagnetic valve 67 correspond to evaporation fuel refluxing device according to the invention.

The internal combustion engine 1 is provided with a crank position sensor 51 composed of a timing rotor 51a attached to the end portion of the crank shaft 23 and an electromagnetic pickup 51b attached to the cylinder block 1b in the vicinity of the timing rotor 51a, and a water temperature sensor 52 attached to the cylinder block 1b for detecting the temperature of the cooling water flowing through the cooling water passage 1c formed within the internal combustion engine 1.

An electronic control unit (ECU) 20 for controlling the operating state of the internal combustion engine 1 is also provided in the internal combustion engine 1 having the above-described structure.

The throttle position sensor 41, airflow meter 44, air-fuel ratio sensor 48, crank position sensor 51, water temperature sensor 52, and valve lift sensors 317 are connected via electrical wiring to the ECU 20. An accelerator position sensor 43 for outputting an electric signal corresponding to the amount of operation of an accelerator pedal 42 mounted in a vehicle compartment is also connected via electrical wiring to the ECU 20. Output signals of these sensors are input in the ECU 20.

The ignitor 25a, intake side drive circuit 30a, exhaust side drive circuit 31a, fuel injection valve 32, throttle actuator 40, electromagnetic valve 67 and the like are connected via electrical wiring to the ECU 20. The ECU 20 can control the ignitor 25a, intake side drive circuit 30a, exhaust side drive circuit 31a, fuel injection valve 32, throttle actuator 40, and electromagnetic valve 67 by using output signal values of the various sensors as parameters.

Figure 11:
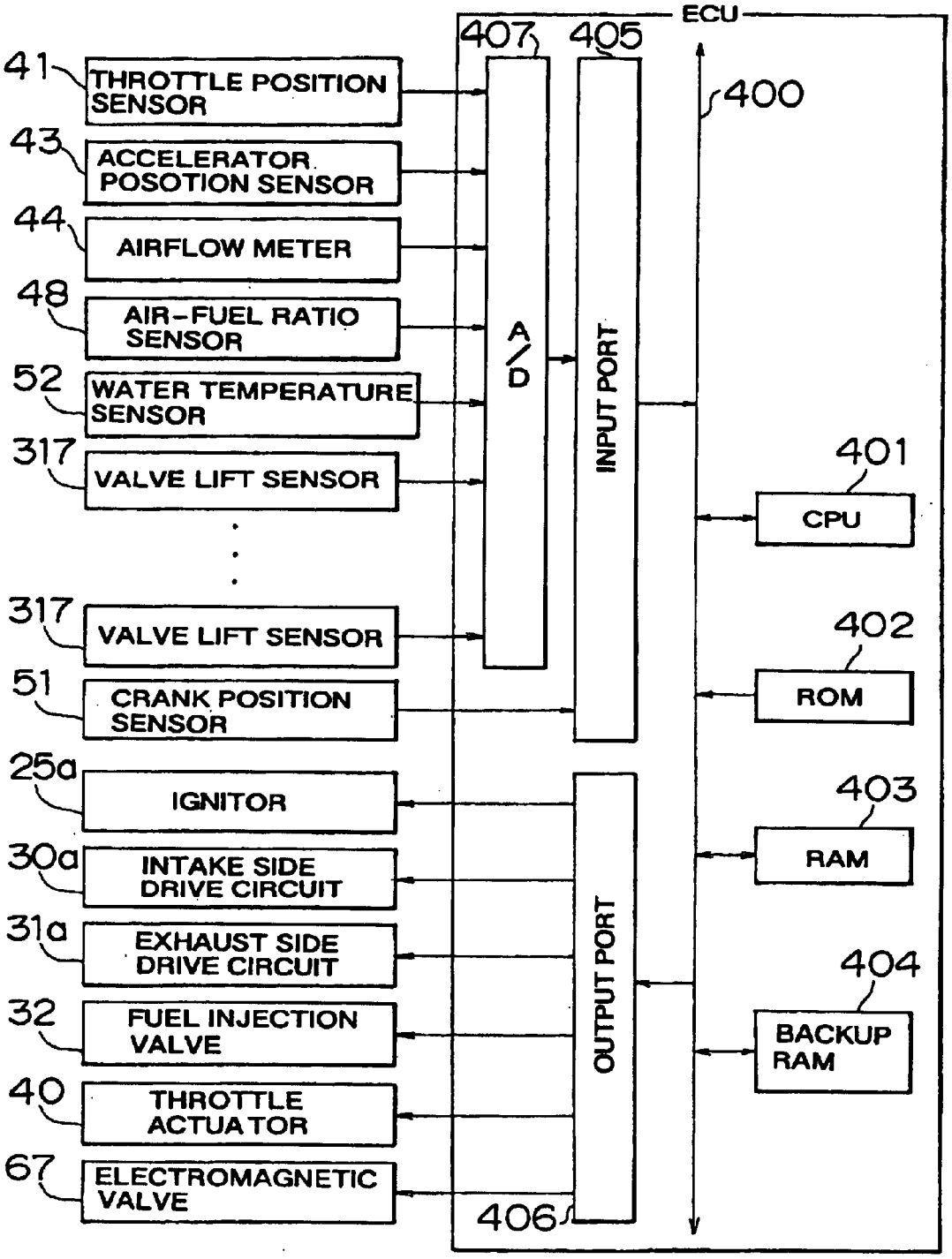
FIG. 11 is a block diagram showing the internal structure of an ECU according to the fourth embodiment.

As is shown in FIG. 11, the ECU 20 is provided with a CPU 401, ROM 402, RAM 403, backup RAM 404, an input port 405, and an output port 406 which are connected to each other via a bi-directional bus 400. The ECU 20 is also provided with an AID converter (A/D) 407 connected to the input port 405.

Sensors that output signals in an analog signal format, such as throttle position sensor 41, accelerator position sensor 43, airflow meter 44, air-fuel ratio sensor 48, water temperature sensor 52, and valve lift sensors 317, are connected via electrical wiring to the A/D 407. The A/D 407 converts the output signals of the above-mentioned sensors from the analog signal format to digital signal format for transmission to the input port 405.

The input port 405 is connected via the A/D 407 to the above-mentioned sensors that output signals in an analog signal format, such as throttle position sensor 41, accelerator position sensor 43, airflow meter 44, air-fuel ratio sensor 48, water temperature sensor 52, and valve lift sensors 317. The input port 405 is also connected to sensors that output signals in a digital signal format such as crank position sensor 51. The input port 405 receives the output signals of the various sensors directly or via the A/D 407, and transmits these output signals to the CPU 401 and RAM 403 over the bi-directional bus 400.

The output port 406 is connected via electrical wiring to the ignitor 25a, intake side drive circuit 30a, exhaust side drive circuit 31a, fuel injection valve 32, throttle actuator 40, electromagnetic valve 67 and the like. The output port 406 receives a control signal output from the CPU 401 over the bi-directional bus 400, and transmits the control signal to the ignitor 25a, intake side drive circuit 30a, exhaust side drive circuit 31a, fuel injection valve 32, throttle actuator 40, or electromagnetic valve 67.

The ROM 402 stores an application program such as a purge control routine for performing purging of the evaporation fuel, in addition to application programs such as: a fuel injection amount control routine for deciding the fuel injection amount; a fuel injection timing control routine for deciding the fuel injection timing; an ignition timing control routine for deciding the ignition timing; an intake valve opening/closing timing control routine for deciding the opening and closing timing of the intake valve 28; an exhaust valve opening/closing timing control routine for deciding the opening and closing timing of the exhaust valve 29; an intake side exciting current amount control routine for deciding the amount of exciting current to be applied to the intake side electromagnetic drive mechanism 30; an exhaust side exciting current amount control routine for deciding the amount of exciting current to be applied to the exhaust side electromagnetic drive mechanism 31; and a throttle opening amount control routine for deciding the opening amount of the throttle valve 39.

The ROM 402 also stores various control maps in addition to the above application programs. Examples of these control maps include: a fuel injection amount control map showing the relationship between the operating state of the internal combustion engine 1 and the fuel injection amount; a fuel injection timing control map showing the relationship between the operating state of the internal combustion engine 1 and the fuel injection timing; an ignition timing control map showing the relationship between the operating state of the internal combustion engine 1 and the ignition timing; an intake valve opening/closing timing control map showing the relationship between the operating state of the internal combustion engine 1 and the opening and closing timing of the intake valve 28; an exhaust valve opening/closing timing control map showing the relationship between the operating state of the internal combustion engine 1 and the opening and closing timing of the exhaust valve 29; an exciting current amount control map showing the relationship between the operating state of the internal combustion engine 1 and the amount of exciting current to be applied to the intake side electromagnetic drive mechanism 30 and exhaust side electromagnetic drive mechanism 31; a throttle opening amount control map showing the relationship between the operating state of the internal combustion engine 1 and the opening amount of the throttle valve 39; a required evaporation fuel amount control map showing the relationship between the state of the internal combustion engine 1, fuel tank 60 or charcoal canister 61 and the amount of evaporation fuel to be purged (the required evaporation fuel amount); and a required duty ratio control map showing the relationship between the required evaporation fuel amount and the opening amount of the electromagnetic valve 67 needed to purge the required evaporation fuel amount (the required duty ratio).

The RAM 403 stores output signals of each sensor, calculation results of the CPU 401, and the like. An example of the calculation results is the number of engine revolutions calculated based on an output signal of the crank position sensor 51. The data stored in the RAM 403 (the data such as output signals of each sensor and calculation results of the CPU 401) is updated to the latest data every time the crank position sensor 51 outputs a pulse signal.

The backup RAM 404 is a non-volatile memory that stores data even after the internal combustion engine 1 has stopped operating. The backup RAM 404 stores learning values relating to various controls, and the like.

The CPU 401 operates in accordance with the application programs stored in the ROM 402. The CPU 401 determines the operating state of the internal combustion engine 1 and the state of the charcoal canister 61 from the output signals of each sensor. Based on the determined operating state and state of the charcoal canister 61 as well as the control maps, the CPU 401 calculates the fuel injection amount, fuel ignition timing, throttle opening amount, ignition timing, opening and closing timing of the intake valve 28, opening and closing timing of the exhaust valve 29, duty ratio for controlling the electromagnetic valve 67, correction amount of the fuel injection amount upon conducting purging, and the like. The CPU 401 then outputs a control signal to the ignitor 25a, fuel injection valve 32, throttle actuator 40, intake side drive circuit 30a, exhaust side drive circuit 31a or electromagnetic valve 67, based on the calculation result.

For example, the CPU 401 determines the operating state of the internal combustion engine 1 from the output signal value of the accelerator position sensor 43, crank position sensor 51 or airflow meter.

If it is determined that the operating state of the internal combustion engine 1 is in a low/medium load region, the CPU 401 conducts so-called non-throttle control. more specifically, the CPU 401 controls the throttle actuator 40 such that the throttle valve 39 is retained at a substantially fully opened position, as well as controls the intake side drive circuit 30a and exhaust side drive circuit 31a such that the intake air amount of the internal combustion engine 1 reaches a desired value. Thus, intake air amount controller is realized by the CPU 401 conducting the non-throttle control.

If it is determined that the operating state of the internal combustion engine 1 is in a high load operating region, the CPU 401 controls the throttle actuator 40 such that the opening amount of the throttle valve 39 corresponds to the output signal valve of the accelerator position sensor 43 (the accelerator opening amount), as well as controls the intake side drive circuit 30a and exhaust side drive circuit 31a such that the torque of the internal combustion engine 1 reaches a desired target value.

If it is determined that the operating state of the internal combustion engine 1 is in an idle operating region, the CPU 401 conducts so-called idle speed control (ISC) feedback control. More specifically, the CPU 401 controls the opening amount of the throttle valve 39 so as to secure the intake air amount required to settle the actual number of revolutions of the internal combustion engine 1 to a desired target value.

Then, the CPU 401 normally renders the electromagnetic valve 67 in a fully closed state upon conducting purging of the evaporation fuel. In this state, if the amount of evaporation fuel in the fuel tank 60 is increased and the pressure in the fuel tank 60 exceeds a first predetermined value, the positive pressure valve of the tank pressure control valve 63 is opened, so that the evaporation fuel passage 62 is rendered in the communicating state.

When the evaporation fuel passage 62 is rendered in the communicating state, the evaporation fuel in the fuel tank 60 flows through the evaporation fuel passage 62 into the charcoal canister 61 so as to be temporarily absorbed by an adsorbent such as active carbon provided in the charcoal canister 61.

The CPU 401 also determines whether predetermined conditions are satisfied or not. Conditions for conducting purging of the evaporation fuel can be exemplified as the predetermined conditions. Examples of the conditions for conducting purging are as follows: the pressure in the fuel tank 60 is equal to or higher than a predetermined value; the fuel concentration in the charcoal canister 61 and evaporation fuel passage 62 is equal to or higher than a predetermined value; the weight of the charcoal canister 61 is equal to or higher than a predetermined value; a predetermined time period or more has passed since the previous purging was conducted; the vehicle has run a predetermined distance or more since the previous purging was conducted; or the internal combustion engine 1 has been operated for a predetermined time period or more at a predetermined outside-air temperature or higher.

If it is determined that the conditions for conducting purging are satisfied, the CPU 401 determines the evaporation fuel amount to be purged (the required evaporation fuel amount) by using the pressure in the fuel tank 60, fuel concentration in the charcoal canister 61, and operating state (the number of engine revolutions, fuel injection amount, and intake air amount) of the internal combustion engine 1 as parameters. Then, the CPU 401 specifies the duty ratio for controlling the electromagnetic valve 67 (the required duty ratio) based on the required evaporation fuel amount.

The CPU 401 applies a pulse signal corresponding to the required duty ratio to the electromagnetic valve 67, and conducts correction to reduce the fuel injection amount based on the required evaporation fuel amount. In response to application of the pulse signal from the CPU 401 to the electromagnetic valve 67, the negative pressure introducing passage 65 is rendered in the communicating state, and thus the purge passage 66 is also rendered in the communicating state.

In this case, the atmosphere open end of the atmospheric air introducing passage 64, which corresponds to the upstream of the purge passage 66, reaches the atmospheric pressure. In addition, the intake pipe 35 downstream of the throttle valve 39, which corresponds to the downstream of the purge passage 66, reaches the negative pressure due to generation of the intake pipe negative pressure. As a result, the pressure difference is produced between the upstream and downstream of the purge passage 66.

Due to this pressure difference, the atmospheric air flows into the purge passage 66 from the atmosphere open end thereof. Then, the atmospheric air in the purge passage 66 is guided into the intake pipe 35 downstream of the throttle valve 39. In other words, such an atmospheric airflow that passes through the charcoal canister 61 is generated within the purge passage 66.

As a result, the evaporation fuel adsorbed by the adsorbent in the charcoal canister 61 is separated therefrom due to the atmospheric airflow, and introduced together with the atmospheric air into the intake pipe 35 downstream of the throttle valve 39. The evaporation fuel thus introduced into the intake pipe 35 (the purge gas) is introduced into the combustion chamber 24 for combustion and processing, as a mixture with the fresh air flowing from upstream of the intake pipe 35 and the fuel injected from the fuel injection valve 32.

In the case where the operating state of the internal combustion engine 1 is in the low/medium load operating region and the non-throttle control is being conducted, the throttle valve 39 is substantially fully opened, so that almost no intake pipe negative pressure is generated in the intake pipe 35 downstream of the throttle valve 39. Therefore, the pressure difference between the upstream and downstream of the purge passage 66 is negligible, making it difficult to purge a desired amount of evaporation fuel.

Thus, in the present embodiment, if the conditions for conducting purging of the evaporation fuel are satisfied while the internal combustion engine 1 is in the non-throttle control state, the CPU 401 controls the throttle actuator 40 so as to close the throttle valve 39 by a predetermined amount. Thus, the CPU 401 causes the intake pipe negative pressure to be generated in the intake pipe 35 downstream of the throttle valve 39, thereby producing the pressure difference between the upstream and downstream of the purge passage 66. Throttle valve controller according to the invention is realized by the CPU 401 controlling the throttle valve 39 as such.

Note that the above-mentioned predetermined amount is preferably set so as to secure the minimum negative pressure required, by using the required evaporation fuel amount and the number of engine revolutions as parameters. This is because the excessively closed throttle valve 39 may possibly increase the fuel consumption due to excessively increased pumping loss of the intake air.

Moreover, the throttle valve 39 merely closed by a predetermined amount may possibly induce torque variation due to reduction in the intake air amount of the internal combustion engine. Therefore, in the present embodiment, in the case where the purge control is conducted with the internal combustion engine 1 being in the non-throttle control state, the CPU 401 controls the throttle actuator 40 so as to close the throttle valve 39 by the predetermined amount, as well as controls the intake side drive circuit 30a and exhaust side drive circuit 31a so as to alter the opening and closing timing of the intake and exhaust valves 28 and 29 to such a timing that increases the intake efficiency of each cylinder 21.

In this case, even if the throttle valve 39 is closed by the predetermined amount so as to generate the pressure difference between the upstream and downstream of the purge passage 66, the intake air amount of each cylinder 21 is not reduced. Therefore, disadvantages such as torque variation do not occur. Valve train controller according to the invention is realized by the CPU 401 controlling the intake side electromagnetic drive mechanism 30 and exhaust side electromagnetic drive mechanism 31 as such.

Hereinafter, purge control according to the present embodiment will be specifically described.

Figure 12:
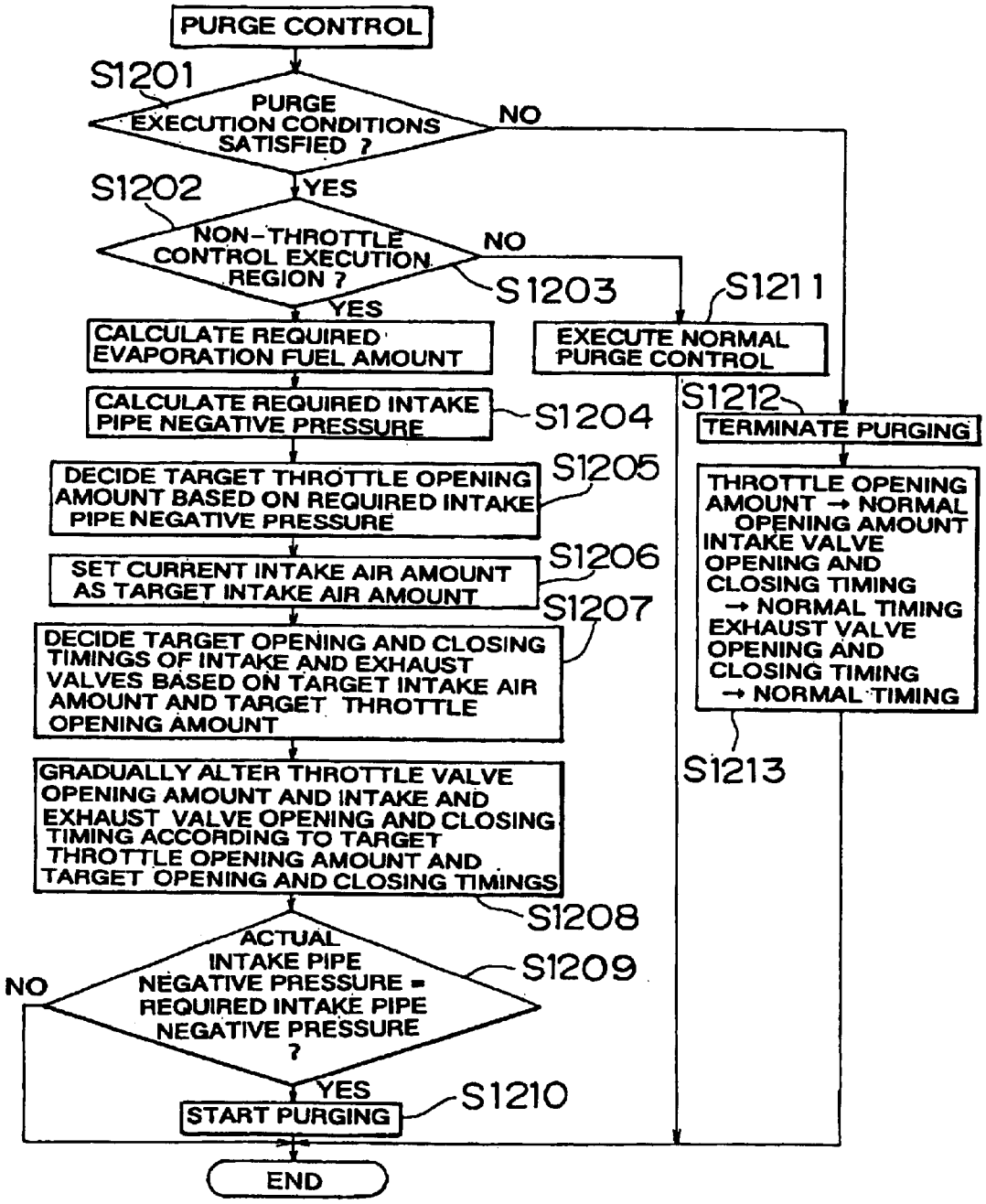
FIG. 12 is a flow chart showing a purge control routine according to the fourth embodiment.

When conducting the purge control, the CPU 401 executes a purge control routine as shown in FIG. 12. This purge control routine is pre-stored in the ROM 402, and repeatedly executed by the CPU 401 at predetermined time intervals (e.g., every time the crank position sensor 51 outputs a pulse signal).

In the purge control routine, the CPU 401 first determines in step S1201 whether the conditions for conducting purging of the evaporation fuel have been satisfied or not.

If it is determined in step S1201 that the conditions for conducting purging of the evaporation fuel have been satisfied, the CPU 401 proceeds to step S1202 to determine whether the operating state of the internal combustion engine 1 is in a non-throttle control execution region or not.

If it is determined in step S1202 that the operating state of the internal combustion engine 1 is not in the non-throttle control execution region, the CPU 401 proceeds to step S1211 to conduct the normal purge control.

On the other hand, if it is determined in step S1202 that the operating state of the internal combustion engine 1 is in the non-throttle control execution region, the CPU 401 proceeds to step S1203 to calculate the evaporation fuel amount to be purged (the required evaporation fuel amount) by using the pressure in the fuel tank 60, fuel concentration in the charcoal canister 61, and the like as parameters.

In step S1204, the CPU 401 calculates the minimum intake pipe negative pressure required to purge the required evaporation fuel amount calculated in step S1203 (the target intake pipe negative pressure).

In step S1205, the CPU 401 decides the target throttle opening amount of the throttle valve 39 based on the target intake pipe negative pressure calculated in step S1204.

In step S1206, the CPU 401 receives an output signal of the airflow meter 44 and detects a current intake air amount. The CPU 401 then sets the detected intake air amount as target intake air amount.

In step S1207, the CPU 401 decides the target opening and closing timing of the intake and exhaust valves 28 and 29 by using the target throttle opening amount and the target intake air amount as parameters.

In step S1208, the CPU 401 controls the throttle actuator 40 so as to gradually alter the actual opening amount of the throttle valve 39 to the target throttle opening amount decided in step S1205. The CPU 401 also controls the intake side drive circuit 30a and exhaust side drive circuit 31a so as to gradually alter the opening and closing timing of the intake and exhaust valves 28 and 29 to the target opening and closing timing decided in step S1207.

In step S1209, the CPU 401 determines whether the actual intake pipe negative pressure has been reduced to the required intake pipe negative pressure or not. Here, the actual intake pipe negative pressure may be estimated by using the opening amount of the throttle valve 39 (the target throttle opening amount), the output signal value of the airflow meter 44 (the intake air amount) and the like as parameters, or may be directly detected by a pressure sensor provided for detecting the pressure in the surge tank 34.

If it is determined in step S1209 that the actual intake pipe negative pressure has not been reduced to the required intake pipe negative pressure, the CPU 401 temporarily terminates the routine. The CPU 401 again executes the routine a predetermined time thereafter. If it is then determined in step S1209 that the actual intake pipe negative pressure has been reduced to the required intake pipe negative pressure, the CPU 401 proceeds to step S1210.

In step S1210, the CPU 410 conducts purging of the evaporation fuel. More specifically, the CPU 401 specifies the duty ratio for controlling the electromagnetic valve 67 (the required duty ratio) based on the required evaporation fuel amount calculated in step S1203. The CPU 401 then applies a pulse signal corresponding to the required duty ratio to the electromagnetic valve 67, and also reduces the fuel injection amount based on the required evaporation fuel amount.

In this case, by closing the throttle valve 39 by the predetermined amount, the amount of intake air flowing through the throttle valve 39 is reduced, whereby the intake pipe negative pressure is generated in the intake pipe 35 downstream of the throttle valve 39.

As a result, the upstream of the purge passage 66 reaches the atmospheric pressure, and the intake pipe 35 downstream of the throttle valve 39, which corresponds to the downstream of the purge passage 66, reaches the negative pressure, whereby the pressure difference is produced between the upstream and downstream of the purge passage 66.

Due to this pressure difference, the atmospheric air flows into the purge passage 66 from the atmosphere open end thereof. Then, the atmospheric air in the purge passage 66 is guided into the intake pipe 35 downstream of the throttle valve 39. In other words, such an atmospheric airflow that passes through the charcoal canister 61 is generated within the purge passage 66.

When the atmospheric airflow passage through the charcoal canister 61 is generated, the evaporation fuel absorbed by the absorbent in the charcoal canister 61 is separated therefrom due to the atmospheric airflow, and introduced together with the atmospheric air into the intake pipe 35 downstream of the throttle valve 39. The evaporation fuel thus introduced into the intake pipe 35 (the purge gas) is introduced into the combustion chamber 24 for combustion and processing, as a mixture with the fresh air flowing from upstream of the intake pipe 35 and the fuel injected from the fuel injection valve 32.

On the other hand, in the case where the opening amount of the throttle valve 39 is altered to the target throttle opening amount, the opening and closing timing of the intake and exhaust valves 28 and 29 is altered to such a timing that increases the intake efficiency of each cylinder 21, corresponding to the alteration of the opening amount of the throttle valve 39. Therefore, the intake air amount of each cylinder 21 is not reduced, so that torque variation of the internal combustion engine 1 does not occur.

Returning now to FIG. 12, the CPU 401 temporarily terminates the routine after completing the processing of step S1210. The CPU 41 again executes the routine a predetermined time after the current routine is terminated. If the required evaporation fuel amount has been purged at that time, it is determined in step S1201 that the conditions for conducting purging are not satisfied, and the routine proceeds to step S1212.

In step S1212, the CPU 401 closes the electromagnetic valve 67 in order to terminate purging of the evaporation fuel.

In step S1213, the CPU 401 controls the throttle actuator 40 so as to restore the opening amount of the throttle valve 39 to the normal opening amount, as well as controls the intake side drive circuit 30a and exhaust side drive circuit 31a so as to restore the opening and closing timing of the intake and exhaust valves 28 and 29 to the normal opening and closing timing.

Throttle valve controller and valve train controller according to the invention are realized by the CPU 401 executing the purge control routine as such.

Thus, according to the internal combustion engine having the variable valve train of the invention, if the conditions for conducting purging of the evaporation fuel are satisfied while the operating state of the internal combustion engine 1 is in the non-throttle control execution region, the intake pipe negative pressure can be generated without changing the intake air amount of the internal combustion engine 1. Accordingly, purging of the evaporation fuel can be conducted without inducing torque variation of the internal combustion engine 1 and the like.

Note that, in the present embodiment, an electromagnetic valve train in which both intake and exhaust valves are driven to open and close using the electromagnetic force is exemplified as the variable valve train according to the invention. However, only one of the intake and exhaust valves may be formed with the electromagnetic valve train.

Moreover, in the present embodiment, an electromagnetic valve train in which the intake and exhaust valves are driven to open and close using the electromagnetic force is exemplified as the variable valve train according to the invention. However, the variable valve train according to the invention may be any one of the variable valve trains described below or may be an appropriate combination of these variable valve trains. Namely, a hydraulic variable valve train using hydraulic pressure instead of the electromagnetic force; and a mechanical variable valve train which, in an internal combustion engine provided with a camshaft that drives intake and exhaust valves to open and close using the rotation force of a crankshaft, adjusts the opening and closing timing of the intake and exhaust valves by altering the rotation phase of the camshaft relative to the crankshaft.

Figure 13:
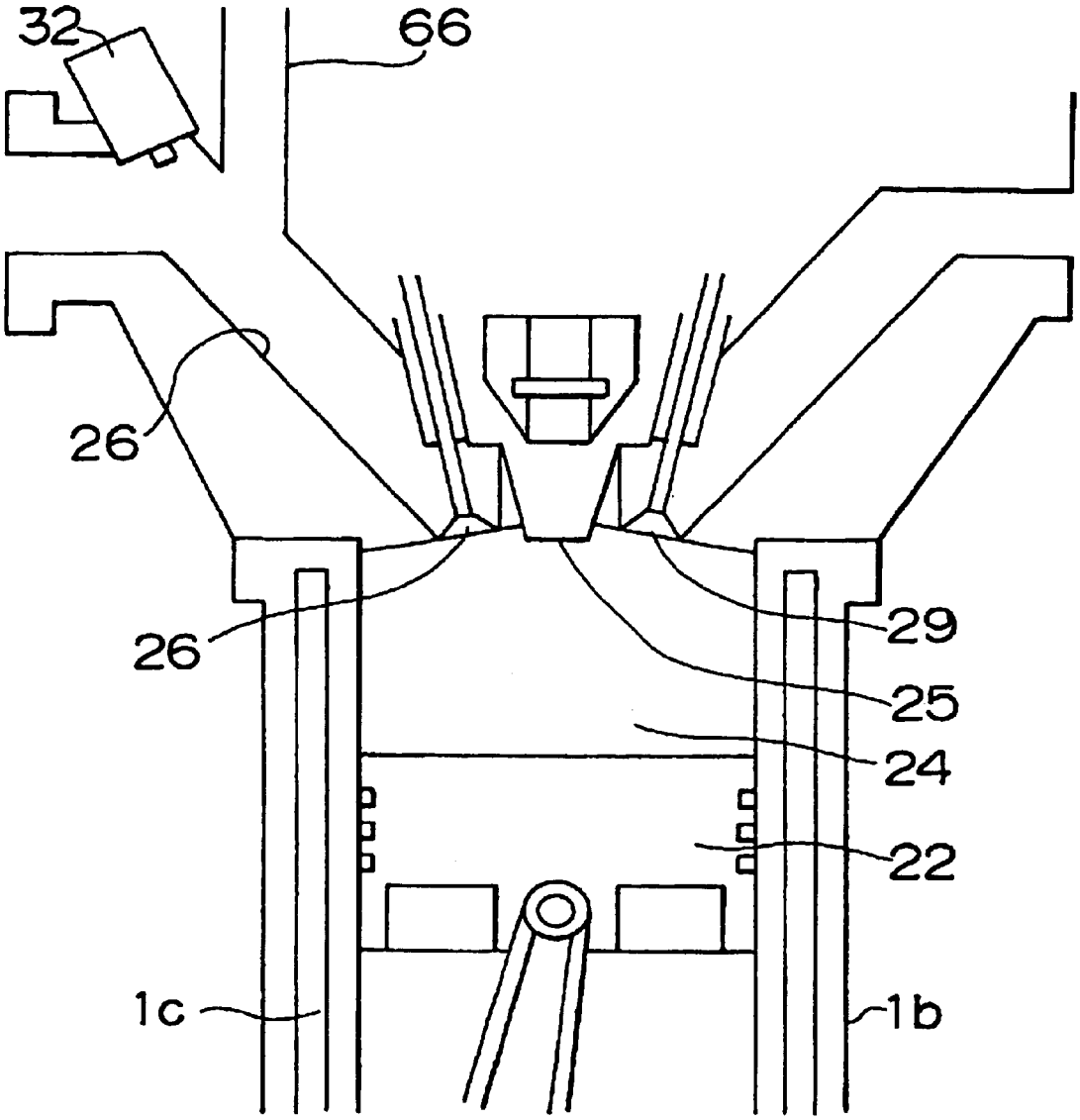
FIG. 13 is a diagram showing a modification of a portion in the vicinity of an intake port in an internal combustion engine.

In the present embodiment, the structure is described in which the downstream end of the purge passage 66 is connected to the intake pipe 35 downstream of the throttle valve 39. Alternatively, however, as shown in FIGS. 13 and 14, the purge passage 66 may be branched into four branch pipes 66A, 66B, 66C and 66D halfway therethrough so that the branch pipes 66A, 66B, 66C and 66D may be connected to the intake ports 26 of the respective cylinders 21.

The internal combustion engine 1 of the present embodiment has two intake ports 26 per cylinder. Therefore, each branch pipe 66A, 66B, 66C, 66D of the purge passage 66 may be connected to at least one of the two intake ports 26 of the respective cylinder 21. Alternatively, each branch pipe 66A, 66B, 66C, 66D may further be branched into two branch pipes so as to be connected to both intake ports 26 of the respective cylinder 21. Alternatively, the purge passage 66 may be branched into eight branch pipes so that these branch pipes are connected to the intake ports 26 of the internal combustion engine 1 in one-to-one correspondence.

Figure 14:
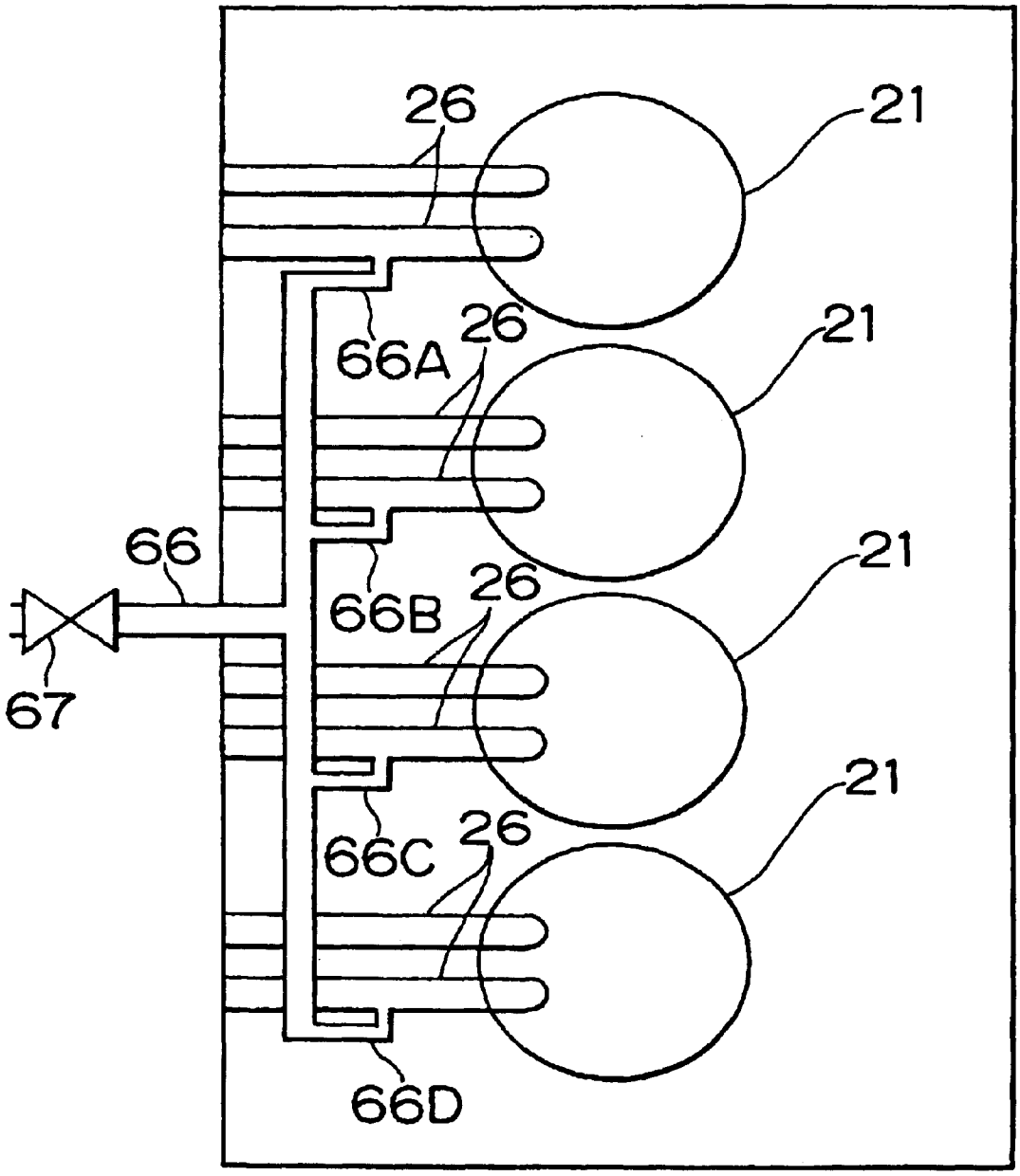
FIG. 14 is a diagram showing a modification of a purge passage.
Figure 15:
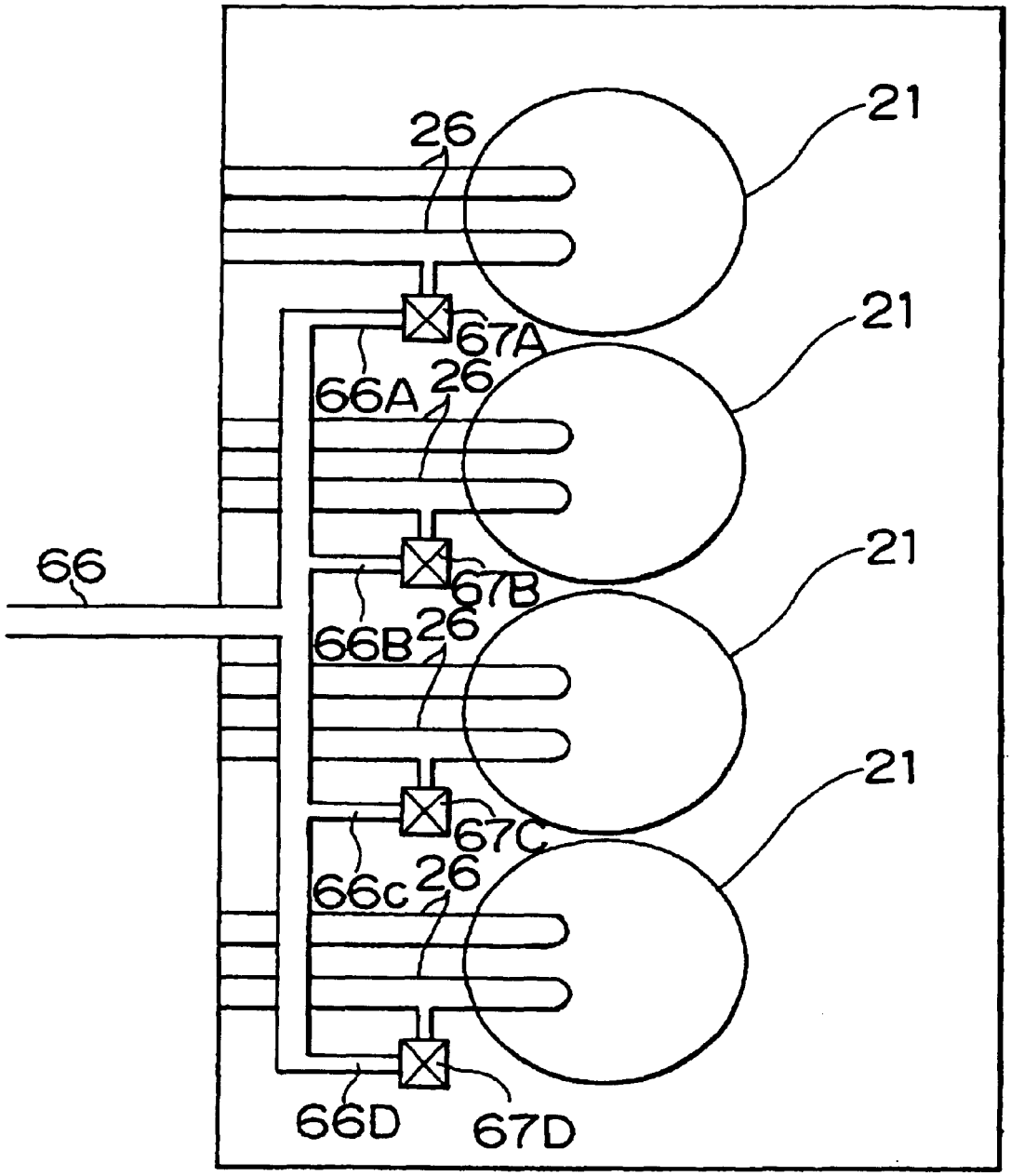
FIG. 15 is a diagram showing a modification of a purge passage.

As shown in FIG. 14, only one electromagnetic valve 67 for opening and closing the flow path in the purge passage 66 may be provided in the purge passage 66 upstream of the position branched into four branch pipes 66A, 66B, 66C and 66D. Alternatively, as shown in FIG. 15, electromagnetic valves 67A, 67B, 67C and 67D may be independently provided in the respective branch pipes 66A, 66B, 66C and 66D.

In this case, the electromagnetic valves 67A, 67B, 67C and 67D are preferably provided in the respective branch pipes 66A, 66B, 66C and 66D at positions in the vicinity of the corresponding intake ports 26. The reason for this is as follows: if the distance from the electromagnetic valve 67A, 67B, 67C, 67D to the intake port 26 is increased, the response delay time is produced from the time the electromagnetic valve 67 is opened until the evaporation fuel actually reaches the intake port 26. Therefore, the purge control (e.g., correction to reduce the fuel injection amount) must be conducted in consideration of the response delay time, thereby complicating the purge control.

As shown in FIG. 13, the branch pipes 66A, 66B, 66C and 66D are preferably provided to face the corresponding intake ports 26 from above. This is in order to prevent clogging of the branch pipes 66A, 66B, 66C and 66D due to adhesion of the liquefied fuel or water onto the branch pipes 66A, 66B, 66C and 66D.

In the case where the downstream end of the purge passage 66 is connected to the intake port 26 of the internal combustion engine 1 as described above, the evaporation fuel within the purge passage 66 can be introduced into the intake port 26 by using the flow velocity of the intake air. This is because the cross sectional area of the intake port 26 is smaller than that of the intake pipe 35, and the flow velocity of the intake air flowing through the intake port 26 is higher than that of the intake air flowing through the intake pipe 35.

As a result, in the case where the operating state of the internal combustion engine 1 is in the non-throttle control execution region, the evaporation fuel can be purged with little change in the throttle opening amount.

What is claimed is:

1. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage; and a negative pressure generating device that controls at least one of the variable valve train and the throttle valve to generate an intake pipe negative pressure when a predetermined condition is satisfied, wherein the negative pressure generating device controls the variable valve train so as to increase pump efficiency of the internal combustion engine and also closes the throttle valve by a predetermined amount, when a negative pressure for operation of the negative pressure mechanism is insufficient.

2. The internal combustion engine according to claim 1, wherein the negative pressure generating device controls the variable valve train so as to increase pump efficiency of the internal combustion engine and also closes the throttle valve by a predetermined amount, when a vehicle provided with the internal combustion engine is running in a deceleration state.

3. The internal combustion engine according to claim 1, wherein the variable valve train drives at least one of the intake valve and the exhaust valve to open and close using electromagnetic force.

4. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage; and a negative pressure generating device that controls at least one of the variable valve train and the throttle valve to generate an intake pipe negative pressure when a predetermined condition is satisfied, wherein the negative pressure generating device controls the variable valve train and the throttle valve so as not to generate torque variation of the internal combustion engine, when the intake pipe negative pressure is to be generated.

5. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage; and a negative pressure generating device that controls at least one of the variable valve train and the throttle valve to generate an intake pipe negative pressure when a predetermined condition is satisfied, wherein the negative pressure generating device controls the variable valve train and the throttle valve such that required torque for the internal combustion engine matches actual torque thereof, when the intake pipe negative pressure is to be generated.

6. The internal combustion engine according to claim 5, wherein the required torque is determined by using a number of revolutions of the internal combustion engine and an accelerator opening amount as parameters.

7. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage;

a throttle valve controller that closes the throttle valve by a predetermined amount when a predetermined condition is satisfied; and a valve train controller that, in a case where the throttle valve controller closes the throttle valve by the predetermined amount, controls the variable valve train so as to alter at least one of the opening and closing timing and the opening amount of at least one of the intake valve and the exhaust valve *to increase pump efficiency of the internal combustion engine* with respect to a case where the throttle valve controller does not close the throttle valve by the predetermined amount.

8. The internal combustion engine according to claim 7, wherein the valve train controller controls the variable valve train such that required torque for the internal combustion engine matches actual torque thereof, when the throttle valve controller closes the throttle valve by the predetermined amount.

9. The internal combustion engine according to claim 8, wherein the required torque is determined by using a number of revolutions of the internal combustion engine and an accelerator opening amount as parameters.

10. The internal combustion engine according to claim 7, wherein the valve train controller controls the variable valve train so as to suppress torque variation of the internal combustion engine, when the throttle valve controller closes the throttle valve by the predetermined amount.

11. The internal combustion engine according to claim 7, wherein the negative pressure mechanism is an evaporation fuel reflux mechanism for refluxing evaporation fuel generated in a fuel tank into the intake passage, and the throttle valve controller closes the throttle valve by the predetermined amount when the evaporation fuel reflux mechanism needs to be operated.

12. The internal combustion engine according to claim 7, wherein the variable valve train drives at least one of the intake valve and the exhaust valve to open and close using electromagnetic force.

13. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage;

a throttle valve controller that closes the throttle valve by a predetermined amount when a predetermined condition is satisfied; and an intake air amount controller that controls the variable valve train to adjust an intake air amount of the internal combustion engine while retaining the throttle valve at a predetermined opening amount, when the internal combustion engine is in a predetermined operating state, wherein the throttle valve controller closes the throttle valve by the predetermined amount when the predetermined condition is satisfied while the intake air amount controller is controlling the intake air amount of the internal combustion engine.

14. The internal combustion engine according to claim 13, further comprising a valve train controller that controls the variable valve train such that the intake air amount of the internal combustion engine does not change when the throttle valve controller closes the throttle valve by the predetermined amount.

15. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage;

a throttle valve controller that closes the throttle valve by a predetermined amount when a predetermined condition is satisfied; and a valve train controller that, in a case where the throttle valve controller closes the throttle valve by the predetermined amount, controls the variable valve train so as to alter at least one of the opening and closing timing and the opening amount of at least one of the intake valve and the exhaust valve with respect to a case where the throttle valve controller does not close the throttle valve by the predetermined amount.

16. The internal combustion engine according to claim 15, wherein the valve train controller controls the variable valve train such that required torque for the internal combustion engine matches actual torque thereof, when the throttle valve controller closes the throttle valve by the predetermined amount.

17. The internal combustion engine according to claim 16, wherein the required torque is determined by using a number of revolutions of the internal combustion engine and an accelerator opening amount as parameters.

18. The internal combustion engine according to claim 15, wherein the valve train controller controls the variable valve train so as to suppress torque variation of the internal combustion engine, when the throttle valve controller closes the throttle valve by the predetermined amount.

19. The internal combustion engine according to claim 15, wherein the variable valve train drives at least one of the intake valve and the exhaust valve to open and close using electromagnetic force.

20. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage;

an intake air amount controller that controls the variable valve train to adjust an intake air amount of the internal combustion engine while retaining the throttle valve at a predetermined opening amount, when an operating state of the internal combustion engine is in a predetermined operating region; and a throttle valve controller that closes the throttle valve by a predetermined amount from the predetermined opening amount when a predetermined condition is satisfied while the intake air amount controller is controlling the intake air amount of the internal combustion engine.

21. The internal combustion engine according to claim 20, wherein the variable valve train drives at least one of the intake valve and the exhaust valve to open and close using electromagnetic force.

22. An internal combustion engine comprising:

a variable valve train capable of adjusting at least one of an opening and closing timing and an opening amount of at least one of an intake valve and an exhaust valve of the internal combustion engine;

a negative pressure mechanism that operates using an intake pipe negative pressure generated in an intake passage of the internal combustion engine;

a throttle valve for adjusting a flow rate of intake air flowing through the intake passage;

an intake air amount controller that controls the variable valve train to adjust an intake air amount of the internal combustion engine while retaining the throttle valve at a predetermined opening amount, when an operating state of the internal combustion engine is in a predetermined operating region;

an evaporation fuel reflux mechanism that refluxes evaporation fuel generated in a fuel tank of the internal combustion engine into the intake passage; and a throttle valve controller that closes the throttle valve by a predetermined amount from the predetermined opening amount when the evaporation fuel reflux mechanism needs to be operated while the intake air amount controller is controlling the intake air amount of the internal combustion engine.

23. The internal combustion engine according to claim 22, wherein the variable valve train drives at least one of the intake valve and the exhaust valve to open and close using electromagnetic force.

*24. The internal combustion engine according to claim 15, wherein in the case where the throttle valve controller closes the throttle valve by the predetermined amount, the valve train controller controls the variable valve train so as to increase intake efficiency concerning the intake air, compared to the case where the throttle valve controller does not close the throttle valve by the predetermined amount.*

*25. The internal combustion engine according to claim 15, wherein in the case where the throttle valve controller closes the throttle valve by the predetermined amount, the valve train controller controls the variable valve train so as to increase pump efficiency of the internal combustion engine, compared to the case where the throttle valve controller does not close the throttle valve by the predetermined amount.*

*26. The internal combustion engine according to claim 15, wherein in the case where the throttle valve controller closes the throttle valve by the predetermined amount, the valve train controller controls the variable valve train such that fluctuation of torque in the internal combustion engine is reduced, compared to the case where the throttle valve controller does not close the throttle valve by the predetermined amount.*

*27. An internal combustion engine comprising:*

*a variable valve train capable of adjusting at least one of an opening and closing timing and an opening amount of at least one of an intake valve and an exhaust valve of the internal combustion engine;*

*a negative pressure mechanism that operates using an intake pipe negative pressure generated in an intake passage of the internal combustion engine;*

*a throttle valve for adjusting a flow rate of intake air flowing through the intake passage; and*

*a negative pressure generating device that controls at least one of the variable valve train and the throttle valve to generate an intake pipe negative pressure when a predetermined condition is satisfied, wherein the negative pressure generating device controls the variable valve train so as to increase pump efficiency of the internal combustion engine and also closes the throttle valve by a predetermined amount.*

*28. The internal combustion engine according to claim 27, wherein the negative pressure generating device controls the variable valve train to adjust an intake air amount of the internal combustion engine while controlling the throttle valve at a predetermined opening amount.*

*29. The internal combustion engine according to claim 27, wherein the negative pressure generating device controls the variable valve train and the throttle valve such that fluctuation of torque in the internal combustion engine is reduced.*

*30. An internal combustion engine comprising:*

*a variable valve train capable of adjusting at least one of an opening and closing timing and an opening amount of at least one of an intake valve and an exhaust valve of the internal combustion engine;*

*a negative pressure mechanism that operates using an intake pipe negative pressure generated in an intake passage of the internal combustion engine;*

*a throttle valve for adjusting a flow rate of intake air flowing through the intake passage; and*

*a controller that controls the variable valve train to adjust an intake air amount of the internal combustion engine when the internal combustion engine is in a predetermined operating state, wherein the controller closes the throttle valve by a predetermined amount when a predetermined condition is satisfied while the controller is controlling the intake air amount of the internal combustion engine.*

*31. The internal combustion engine according to claim 30, wherein in the case where the controller closes the throttle valve by the predetermined amount, the controller controls the variable valve train so as to alter at least one of the opening and closing timing and the opening amount of at least one of the intake and exhaust valves to increase pump efficiency of the internal combustion engine, compared to the case where the controller does not close the throttle valve by the predetermined amount.*

*32. The internal combustion engine according to claim 30, wherein in the case where the controller closes the throttle valve by the predetermined amount, the controller controls the variable valve train so as to alter at least one of the opening and closing timing and the opening amount of at least one of the intake and exhaust valves to increase intake efficiency of the internal combustion engine, compared to the case where the controller does not close the throttle valve by the predetermined amount.*

*33. An internal combustion engine comprising:*

*a variable valve train capable of adjusting at least one of an opening and closing timing and an opening amount of at least one of an intake valve and an exhaust valve of the internal combustion engine;*

*a negative pressure mechanism that operates using an intake pipe negative pressure generated in an intake passage of the internal combustion engine;*

*a throttle valve for adjusting a flow rate of intake air flowing through the intake passage; and*

*a negative pressure generating device that controls at least one of the variable valve train and the throttle valve to generate an intake pipe negative pressure when a predetermined condition is satisfied, wherein the negative pressure generating device controls the variable valve train so as to increase intake efficiency of the internal combustion engine and also closes the throttle valve by a predetermined amount.*

* * * * *